United States Patent
Shih et al.

(10) Patent No.: US 12,179,790 B2
(45) Date of Patent: Dec. 31, 2024

(54) HYBRID AUTONOMY SYSTEM FOR AUTONOMOUS AND AUTOMATED DELIVERY VEHICLE

(71) Applicant: DoorDash, Inc., San Francisco, CA (US)

(72) Inventors: Harrison Shih, San Francisco, CA (US); Mishel George, San Francisco, CA (US)

(73) Assignee: DoorDash, Inc., San Francisco, CA (US)

( * ) Notice: Subject to any disclaimer, the term of this patent is extended or adjusted under 35 U.S.C. 154(b) by 77 days.

(21) Appl. No.: 16/917,827

(22) Filed: Jun. 30, 2020

(65) Prior Publication Data

US 2021/0403024 A1     Dec. 30, 2021

(51) Int. Cl.
| | | |
|---|---|---|
| *B60W 60/00* | (2020.01) | |
| *B60W 50/14* | (2020.01) | |
| *G06Q 10/0833* | (2023.01) | |

(52) U.S. Cl.
CPC .......... *B60W 60/001* (2020.02); *B60W 50/14* (2013.01); *G06Q 10/0833* (2013.01);
(Continued)

(58) Field of Classification Search
CPC .............. B60W 60/001; B60W 50/14; B60W 2554/4041; B60W 2554/4044;
(Continued)

(56) References Cited

U.S. PATENT DOCUMENTS

| | | | | |
|---|---|---|---|---|
| 8,588,976 B2* | 11/2013 | Mangaser | .............. | H04N 7/185 |
| | | | | 700/250 |
| 2007/0198939 A1* | 8/2007 | Gold | ....................... | G06T 15/00 |
| | | | | 715/757 |

(Continued)

FOREIGN PATENT DOCUMENTS

| | | | |
|---|---|---|---|
| CN | 102307300 A | * | 1/2012 |
| KR | 1020200075915 A | | 6/2020 |

OTHER PUBLICATIONS

Machine translation of CN-102307300-A (Year: 2012).*
(Continued)

*Primary Examiner* — Mahmoud S Ismail
*Assistant Examiner* — Gabriel Anfinrud
(74) *Attorney, Agent, or Firm* — Kwan & Olynick LLP

(57) ABSTRACT

Provided are various systems and processes for improving last-mile delivery of real-time, on-demand orders for perishable goods. In one aspect, a method for operating an autonomous vehicle comprises receiving real-time perception data at a planner module located on the autonomous vehicle, and generating an initial motion plan based on the real-time perception data. The autonomous vehicle is maneuvered along a constrained route based on the initial motion plan without user input. An alert condition is detected from the real-time perception data, and a notification is displayed at an operator device. The notification includes a request for user input to adjust the initial motion plan. User input is received at the planner module and a modified motion plan is generated by adjusting the initial motion plan based on the user input. A virtual representation of objects identified by the AV is locally rendered for display at the operator device.

20 Claims, 12 Drawing Sheets

(52) U.S. Cl.
CPC .............. *B60W 2050/146* (2013.01); *B60W 2554/4041* (2020.02); *B60W 2554/4044* (2020.02); *B60W 2554/4045* (2020.02); *B60W 2710/20* (2013.01)

(58) Field of Classification Search
CPC ... B60W 2554/4045; B60W 2050/146; B60W 2710/20; G06Q 10/0833
See application file for complete search history.

(56) References Cited

U.S. PATENT DOCUMENTS

| | | | |
|---|---|---|---|
| 2018/0348750 A1* | 12/2018 | Lupa .................... | G05D 1/0022 |
| 2019/0168748 A1* | 6/2019 | Kroop ................... | B60W 10/04 |
| 2019/0213703 A1 | 7/2019 | Winkle et al. | |
| 2019/0286138 A1 | 9/2019 | Skaaksrud et al. | |
| 2020/0004261 A1* | 1/2020 | Kim ........................ | H04W 4/44 |
| 2020/0062555 A1* | 2/2020 | Appling, Jr. ............ | B66C 13/16 |
| 2020/0173787 A1* | 6/2020 | Sullivan .................. | B66C 13/16 |
| 2020/0201319 A1* | 6/2020 | Gross ...................... | H04W 4/44 |

OTHER PUBLICATIONS

International Application Serial No. PCT/US21/34218, Search Report and Written Opinion mailed Sep. 7, 2021, 11 pgs.
Marques et al., The Use of Real-Time Publish-Subscribe Middleware in Networked Vehicle Systems, 10.3182/20061002-2-br-4906.00019, IFAC Proceedings vols. 2006, 6 pages.
International Application Serial No. PCT/US21/34218, International Preliminary Report on Patentability mailed Jan. 12, 2023, 8 pgs.

* cited by examiner

HYBRID AUTONOMY SYSTEM FOR AUTONOMOUS AND AUTOMATED DELIVERY VEHICLE

TECHNICAL FIELD

The present disclosure relates to control systems for autonomous and automated vehicles. In one example, the present disclosure relates to mechanisms and processes for a hybrid autonomy system for operating vehicles for last-mile deliveries.

BACKGROUND

Logistics platforms, particularly logistics platforms for managing real-time on-demand delivery of perishable goods, rely on accurate location, status, and routing mechanisms to effectively and efficiently connect consumers with providers. However, logistics platforms may be inefficient or experience delays due to human error.

Consequently, it is desirable to provide improved mechanisms for automating delivery routes and the handling of orders, particularly with respect to transportation of real-time on-demand deliveries of perishable goods.

SUMMARY

Provided are various mechanisms and processes for optimizing real-time, on-demand delivery of perishable goods. In one aspect, which may include at least a portion of the subject matter of any of the preceding and/or following examples and aspects, a method is provided for operating an autonomous vehicle for delivery of perishable goods. The method comprises operating in a first mode by receiving real-time perception data at a planner module located on the autonomous vehicle, and generating, via the planner module, an initial motion plan based on the real-time perception data. The autonomous vehicle is maneuvered along a constrained route based on the initial motion plan without user input. The method further comprises detecting an alert condition from the real-time perception data, and displaying a notification corresponding to the alert condition at an operator device. The notification includes a request for user input to adjust the initial motion plan. User input is received at the planner module and a modified motion plan is generated by adjusting the initial motion plan based on the user input.

The method may further comprise converting the modified motion plan into power output signals for a steering mechanism and a motor of the autonomous vehicle, moving the steering mechanism based on the power output signals, and generating wheel motion by the motor based on the power output signals.

The user input may include one or more of the following: longitudinal velocity adjustments, lateral offset adjustments, and an obstacle disregard selection. The real-time perception data may be obtained from a sensor array of the autonomous vehicle. The notification corresponding to the alert condition includes a notification of an unidentified obstacle. The constrained route may lead from a first aggregation depot to a second aggregation depot.

The real-time perception data may include video data captured by an image capture device located on the autonomous vehicle. The real-time perception data may further include geolocation data, object recognition data, object proximity data, and audio data.

The method may further comprise transmitting object recognition data to the operator device. The object recognition data corresponds to identified objects in the video data. A virtual representation of the identified objects may be locally rendered for display at the operator device. The method may further comprise tracking positions of a subset of pixels corresponding to the identified objects, and transmitting changes in the positions of the subset of pixels to the operator device, and displaying, at the operator device, movement of the identified objects in the virtual representation based on the changes in the positions of the subset of pixels.

The method may further comprise alternating from the first mode to a second mode. In the second mode, the autonomous vehicle is fully controlled by user input. Alternating from the first mode to the second mode may include selecting an override input at the operator device. In the second mode, a real-time feed of video data captured by the image capture device may be displayed at the operator device.

Other implementations of this disclosure include corresponding devices, systems, and computer programs configured to perform the described methods. These other implementations may each optionally include one or more of the following features. For instance, provided are non-transitory computer readable media storing instructions to execute the described methods.

Also provided is a system comprising an autonomous vehicle and an operator device. The autonomous vehicle comprises a sensor array, planner module and a controller module. The sensor array is configured to obtain real-time perception data, the planner module is configured to generate an initial motion plan based on the real-time perception data, and the controller module is configured to maneuver the autonomous vehicle along a constrained route based on the initial motion plan without user input.

The operator device is configured to receive and display a notification corresponding to an alert condition detected by the autonomous vehicle. The notification includes a request for user input to adjust the initial motion plan. The operator device is further configured to receive user input via a control interface of the operator device. The planner module is further configured to receive the user input and generate a modified motion plan by adjusting the initial motion plan based on the user input.

The controller module is further configured to convert the modified motion plan into power output signals for a steering mechanism and a motor of the autonomous vehicle.

The autonomous vehicle may further comprise an onboard computer configured to identify objects in the video data, track pixel changes to determine movement of objects in the video data, and transmit the pixel changes to the operator device. The operator device may be further configured to locally render and display a virtual representation of identified objects in the video data and display the changes in position of the identified objects in the virtual representation based on the determined movement.

The operator device may be configured to receive an override input at the control interface to activate a direct driving mode. The autonomous vehicle is fully controlled by user input in the direct driving mode. The operator device may be further configured to receive and display a real-time feed of video data captured by the image capture device during the direct driving mode.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments of the present disclosure.

DETAILED DESCRIPTION OF PARTICULAR EMBODIMENTS

Figure 1:
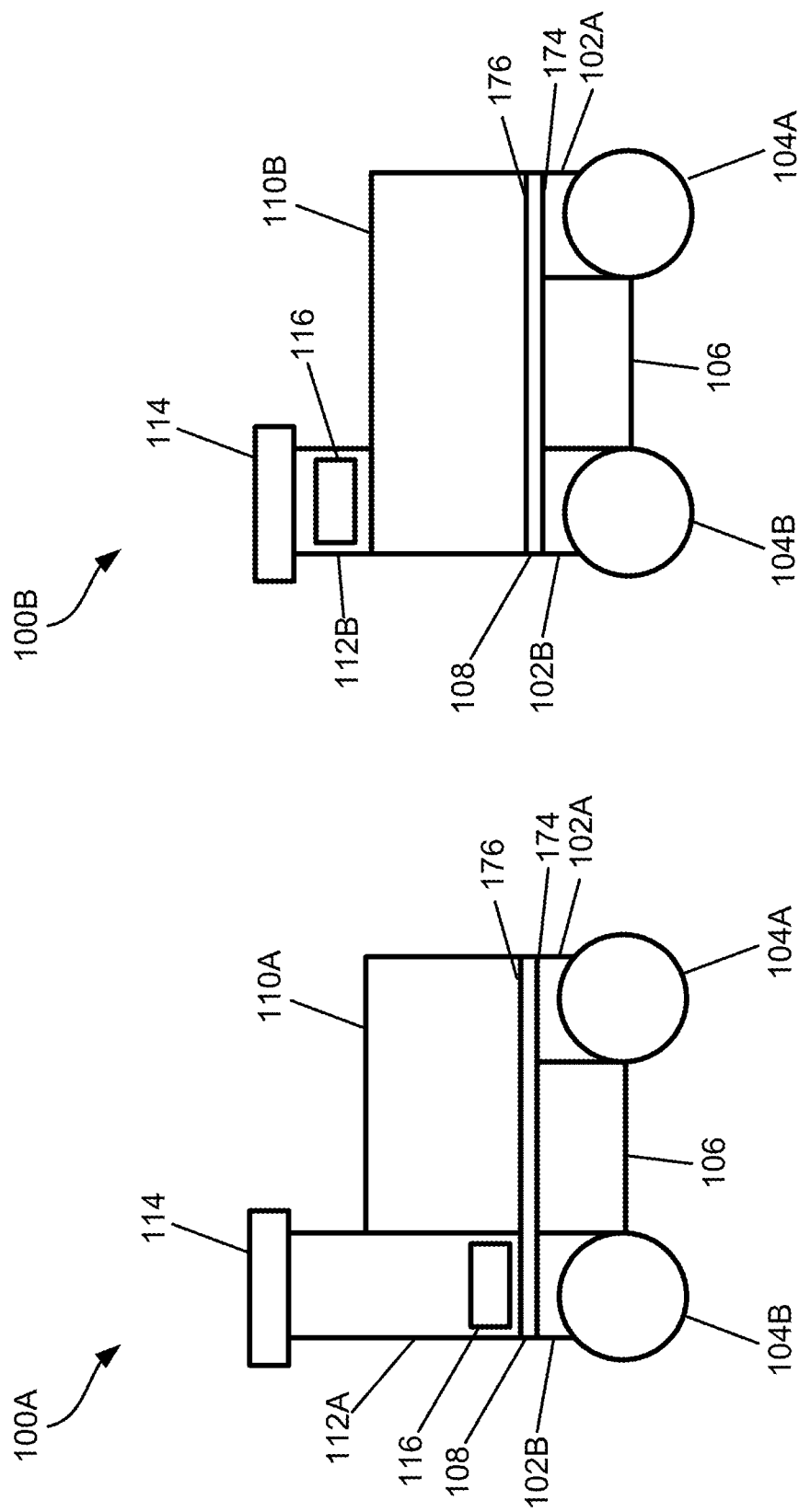
FIG. 1A illustrates an automated perishable goods delivery system, in accordance with one or more embodiments.
FIG. 1B illustrates another automated perishable goods delivery system, in accordance with one or more embodiments.

Reference will now be made in detail to some specific examples of the disclosure including the best modes contemplated by the inventors for carrying out the disclosure. Examples of these specific embodiments are illustrated in the accompanying drawings. While the present disclosure is described in conjunction with these specific embodiments, it will be understood that it is not intended to limit the disclosure to the described embodiments. On the contrary, it is intended to cover alternatives, modifications, and equivalents as may be included within the spirit and scope of the disclosure as defined by the appended claims.

In the following description, numerous specific details are set forth in order to provide a thorough understanding of the present disclosure. Particular embodiments of the present disclosure may be implemented without some or all of these specific details. In other instances, well known process operations have not been described in detail in order not to unnecessarily obscure the present disclosure.

For example, the techniques of the present disclosure will be described in the context of particular protocols, such as Long Term Evolution (LTE), Wi-Fi or Bluetooth. However, it should be noted that the techniques of the present invention may also be applied to variations of protocols. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present disclosure.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

With regard to the present disclosure, logistics platforms managing real-time on-demand deliveries of perishable goods rely on accurate location, status, and routing mechanisms to allow for effective and efficient delivery experiences between providers and customers. In particular, providers located in a variety of disparate locations, particular highly congested disparate locations, can make it difficult for couriers and delivery people to easily pick up perishable goods from these locations. These may be restaurants located in high traffic areas with limited parking. As used herein, the term "provider" may be used to describe various types of merchants that provide goods, including perishable goods, and the terms "provider" and "merchant" may be used interchangeably. As used herein, the term "delivery associate" may be used to describe a driver or courier that is delivers the goods provided by the merchant to a customer, and the terms "delivery associate" and "courier" may be used interchangeably.

Overview

The systems and methods described herein improve last-mile delivery of perishable goods from a merchant to a customer. Last-mile delivery generally refers to the movement of goods from a transportation depot or hub or merchant (e.g., storefront) to a final delivery destination. According to various embodiments, a depot dispatch protocol may be implemented where orders are transported between one or more aggregation depots, including merchant depots and customer depots, along last-mile delivery routes to the final destinations.

In various other embodiments, the systems and methods described herein may be utilized during intermediate delivery of goods. Intermediate delivery may include, for example, delivery from a provider of goods to a hub or depot. Thus, goods may be loaded onto the vehicle described herein by the provider and the vehicle may then be delivered to the hub or depot. After unloading at the hub or depot, the goods may then be loaded for last-mile delivery from the hub or depot.

Systems and methods herein describe an automated delivery system for perishable goods. The automated delivery system described herein may be an autonomous vehicle (AV) that includes a chassis and various modules for propulsion, battery storage, control, storage, sensing, and other functions. Such modules may be quick release modules that allow for quick removal and replacement. In certain embodiments, modules associated with operation of the vehicle may all be disposed on one side of the chassis while modules associated with delivery of items may be disposed on a second side of the chassis. Such a layout may simplify service and operation of the vehicle as servicing of the vehicle can be performed entirely from one side. The vehicle may include a plurality of drive modules. Each drive module may be a module that includes a steering mechanism, wheels, suspension coupled to the wheels, a motor to drive the wheels, and other systems. The drive modules may be modular and may be configured to be disposed at any location on the chassis that is configured to receive a drive module. Thus, the chassis may include multiples of the same type of drive module, allowing for only one drive module to be stocked for repair and maintenance.

In certain embodiments, the AVs are configured to operate in a hybrid autonomy mode in which the onboard computer system of the AV arbitrates between autonomous driving and operator's control inputs in limited circumstances. The onboard computer system may include software nodes, including neural networks and machine learning algorithms, configured to process image and sensor data obtained by a sensor array on the AV and generate real-time perception data including detecting and classifying objects around the AV, as well as the velocity and position of the detected objects. The onboard computer may further use localization and semantic map information to generate a reference trajectory for a predetermined path. In some embodiments, the predetermined path travels between aggregation depots for sorting and aggregating orders of perishable goods.

A planner module may generate a motion plan based on the reference trajectory and the real-time perception data, which is converted to corresponding vehicle control signals to the subsystems of the AV. In the hybrid autonomy mode, the onboard computer is responsible for a majority of the operations of the AV.

In certain circumstances, the AV may detect an alert condition from the real-time perception data. For example, an alert condition may arise where the onboard computer is unable to classify a detected object. Alert conditions may also arise when predetermined objects or locations, such as a busy intersection or emergency vehicles, are detected. In another example, an alert condition may be triggered when the planner module cannot determine a safe motion plan to traverse detected objects.

The alert condition may be transmitted to an operator control unit (OCU), which may cause a notification to display at the OCU. This notification may request operator input to respond to the alert condition. In addition to a display for providing images and other sensor data, the OCU may be configured with various controls inputs such as a throttle stick, steering wheel, and pedals. Using these control inputs, an operator may provide longitudinal velocity, lateral offset, angular offset, and obstacle override, among others. The planner may then modify or adjust the motion plan based on the operator input. The planner may also consider additional real-time perception data received during or after the operator input in adjusting the motion plan.

In certain circumstances, the operator may switch the AV to direct driving mode, in which the operator has full control over operation of the AV via the control inputs at the OCU. However, direct driving mode may require low latency network connectivity to ensure accurate and fast transfer of information to and from the AV to allow the operator to react to objects and obstacles in a direct video feed from the AV.

In contrast, hybrid autonomy mode may be implemented over a higher latency network connection and with less data transfer. Because the motion plan is modified above the planner, the planner retains its ability to use real-time perception data and override the operator input if necessary. Thus, a delay in the video feed or transmission of control signals would not negatively affect operation in hybrid autonomy mode. The video feed may also be transmitted at a slower frame rate during hybrid autonomy mode, further decreasing amount of data processing and transmission.

In certain embodiments, a virtual representation of the video image data is locally rendered at the OCU. For example identified objects may be virtually rendered as avatars based on the classifications by the onboard computer. In some embodiments, static objects that are constant throughout the predetermined route, such as buildings, signs, trees, roads, and sidewalks, are virtually rendered. In some embodiments, the actual images of dynamic and moving objects, such as pedestrians and vehicles, are displayed at the OCU. Images of unclassified objects that are detected may also be directly transmitted and displayed within the virtual rendering.

Thus, only necessary image data is transmitted reducing overall data transmission. This allows improved performance over high latency network connectivity. Movement of the identified objects may be tracked via a subset of pixel changes. This further reduces the amount of data needed to update positions of the objects displayed at the OCU.

The disclosed systems can be used whenever there exists a need to efficiently dispatch deliveries from merchants to third-party delivery fulfillment services. The systems may work especially well when a high volume of deliveries being produced in a specific region can be expected, and are flexible and lightweight enough to set up for special events, road closures, and other situations that would make normal vehicular transport more difficult.

EXAMPLE EMBODIMENTS

FIG. 1A illustrates an automated perishable goods delivery system, in accordance with one or more embodiments. Such automated perishable goods delivery system may be an autonomous or semi-autonomous vehicle (AV). As shown in FIG. 1A, vehicle 100A includes a chassis 108, quick release drive modules 102A and 102B, battery module 106, sensor module 114, control module 112A, and cargo module 110A. In some embodiments, vehicle 100A may be a fully or partially autonomous vehicle (AV).

In various embodiments, vehicle 100 may be a vehicle with an operational profile similar to that of a bicycle or an electric bicycle. That is, vehicle 100 may be of a size (e.g., length or width) that can operate in bicycle lanes. Such a small width may also allow vehicle 100 to operate on sidewalks and other pedestrian walkways. Additionally, the various systems and techniques described herein may allow for vehicle 100 to be able to turn tightly (e.g., have a turning radius of five feet or less) and operate at speeds required for quick and efficient delivery (e.g., a top speed of 25 miles per hour or more) and operate in a variety of weather conditions and temperature ranges.

In the present example, vehicle 100 is managed by a logistics platform for real-time, on-demand, delivery of perishable goods. For instance, a customer may order food from a restaurant by using a mobile device application that places the order through the logistics platform. In some instances, the user may also access the logistics platform through the internet via a computer, laptop, tablet, etc. When the customer orders the food through the logistics platform, the order is prepared at a provider site associated with the logistics platform. A delivery routing system of the logistics platform may then pair orders with couriers or autonomous vehicles for delivery to various locations. The provider may load orders into a paired vehicle 100 for delivery. After vehicle 100 has been loaded, vehicle 100 may then be operated (either fully autonomously or remotely controlled) to deliver the order to the customer. In certain embodiments, one or a plurality or orders may be loaded by one service provider into vehicle 100, but other embodiments may have vehicle 100 stopping by multiple service providers to receive one or more orders from each service provider before the orders are delivered.

According to various examples, a provider may be a merchant that prepares perishable goods such as food at a restaurant. Other such merchants may be any combination of one or more of the following: restaurants, bars, cafes, or other vendor of food or beverages, such as a hotel. Such venues may also be referred to herein as HORECA (Hotel/Restaurant/Café) which is a term or abbreviation used to describe entities in the food service industry.

In some examples, provider sites may also provide other perishable goods such as floral arrangements, medications, refrigerated or frozen items, live animals, etc. that may need real-time, on-demand delivery to a customer. Accordingly, although various examples in the present disclosure may describe the provider sites and logistics platform in the context of restaurants and food delivery, the mechanisms and processes described herein may also be applied to the delivery of various other perishable items.

The modules described herein can each be coupled to the chassis 108 through one or more quick release connections. The quick release connections allow for the quick release modules to be mechanically secured to chassis 108 and communicatively coupled to chassis 108 and/or control module 112A. Thus, such quick release connections may include mechanical connections (e.g., fasteners that, when secured, prevents the module from decoupling from chassis 108), electrical connections (e.g., one or more connectors that can provide electrical power), and data connections (e.g., one or more connectors that can communicate data).

Drive modules 102A and 102B may each include one or more wheels 104A and 104B, respectively, as well as steering mechanisms, motors, suspension, and other components described herein. The steering mechanisms are coupled to the wheels to allow steering control of vehicle 100A. The motors are configured to provide motive power (e.g., drive) to the wheels and the suspension can absorb bumps and impacts encountered by vehicle 100A during operation of vehicle 100A.

As shown in FIG. 1A, drive module 102A is disposed on a first end of vehicle 100A and drive module 102B is disposed on a second end of vehicle 100A. In certain embodiments, drive modules 102A and 102B may be substantially similar. In various embodiments, vehicle 100A may be configured to be primarily driven in one or multiple directions. In certain such embodiments, including motors within each of drive modules 102A and 102B may allow for vehicle 100 to be operated in a plurality of directions at substantially the same speed. Additionally, as each of drive modules 102A and 102B include steering mechanisms, either or both ends of vehicle 100 may provide steering control, increasing agility and versatility of vehicle 100. Such a configuration may be useful in, for example, a crowded or urban environment with limited space as vehicle 100 may be able to maneuver within limited spaces without the need to reverse or change directions.

Battery module 106 is an electrical power storage device. Battery module 106 may be configured to power one or more of the motor, steering mechanism, sensors, control systems, and other systems of vehicle 200. Though FIG. 1A illustrates a vehicle 200 with a single battery module, other embodiments may include a plurality of battery modules.

Battery module 106 may include quick release connections and may be coupled to chassis 108. As battery module 106 and drive modules 102A and 102B are items that may require regular service, battery module 106 and drive modules 102A and 102B are disposed on a first side 174 of chassis 108. Such a configuration simplifies service of vehicle 100A as items that require regular servicing may all be disposed on one portion of chassis 108. Thus, any service may only require lifting of vehicle 100A in a certain manner (e.g., to allow a mechanic access to the modules on the bottom of vehicle 100A). Furthermore, service procedures are then standardized as mechanics can be trained to access the bottom of vehicle 100A in all or most service situations, avoiding confusion that results from multiple different service procedures.

As shown, battery module 106 may be disposed between drive modules 102A and 102B. In certain embodiments, battery module 106 may be directly connected to drive modules 102A and 102B (e.g., through quick release connectors). Thus, when drive modules 102A and/or 102B and battery module 106 are coupled to chassis 108, battery module 106 may be electrically coupled to drive modules 102A and/or 102B via such connectors. Thus, battery module 106 may power drive modules 102A and/or 102B.

In other embodiments, battery module 106 may provide electrical power to drive modules 102A and/or 102B via chassis 108. Thus, in such embodiments, chassis 108 may include electrical connections that couple to both battery module 106 and drive modules 102A and/or 102B. As such, battery module 106 may provide electrical power to drive modules 102A and/or 102B via chassis 108 as an intermediate connection. In certain such embodiments, chassis 108 may thus function as a power distributor to various systems of vehicle 100A.

Chassis 108 may provide structural rigidity to vehicle 100. As such, chassis 108 may be, for example, a backbone chassis, a space frame, a monocoque, and/or another type of such chassis. Chassis 108 may include connections to couple to one or more modules of vehicle 100 (e.g., drive modules 102A and 102B, battery module 106, and/or other components). In certain embodiments, chassis 108 may distribute electrical power and data. Thus, for example, battery module 106 may provide electrical power first to chassis 108 before circuitry within chassis 108 distributes the electrical power to other modules. Additionally, control module 112A may provide instructions to drive modules 102A and 102B through data connections disposed within chassis 108. Thus, control module 112A may be communicatively coupled to data circuitry within chassis 108 and such data circuitry may be additionally coupled to drive modules 102A and 102B.

Instructions from control module 112A may thus be communicated to drive modules 102A and 102B via chassis 108.

Control module 112A may implement various processing functions for operation of vehicle 100. In some embodiments, instructions and other information may be manually input at user interface 116. Control module 112A may include one or more processors, logic devices, memories, batteries, and other circuitry to receive inputs and determine commands for operation of vehicle 100.

According to particular example embodiments, control module 112A uses memory to store data and program instructions for operations described herein. The program instructions may control the operation of an operating system and/or one or more applications, for example. The memory or memories may also be configured to store received metadata and batch requested metadata. The memory or memories may also be configured to store data corresponding to parameters and weighted factors. In some embodiments, control module 112A further comprises a graphics processing unit (GPU). As described, the GPU may be implemented to process each image obtained by sensor module 114. In some embodiments, control module 112A further includes an accelerator (e.g., a rendering accelerator chip) which may be separate from the GPU. The accelerator may be configured to speed up the processing by processing pixels in parallel to prevent overloading of control module 112A or the GPU. For example, in certain instances, ultra-high-definition images may be processed, which include many pixels, such as DCI 4K or UHD-1 resolution. In some embodiments, the accelerator may only be utilized when high system loads are anticipated or detected.

Control module 112A may receive and provide data to modules of vehicle 100. In certain embodiments, control module 112A may receive data from such modules and provide instructions for operation of vehicle 100, thus forming a feedback loop. In such embodiments, control module 112A may be communicatively coupled to sensor module 114 and instructions for operation of vehicle 100 may be based on data received from sensor module 114. As an example, the controller module may communicate with various modules and various embedded control units (ECUs) via Controller Area Network (CAN bus) protocol. As used herein, ECU may refer to an embedded processor system in automotive electronics that controls one or more of the electrical systems or subsystems in the vehicle. Various examples of ECUs include engine control module (ECM), Powertrain Control Module (PCM), Transmission Control Module (TCM), Brake Control Module (BCM or EBCM), Central Control Module (CCM), Central Timing Module (CTM), General Electronic Module (GEM), Body Control Module (BCM), Suspension Control Module (SCM), control unit, or control module.

Sensor module 114 may include one or more of radar sensors, LIDAR sensors, visual sensors, thermal sensors, magnetic sensors, and/or other such sensors directed towards a certain direction or configured to sense around all of vehicle 100. Sensor module 114 may sense the environment around vehicle 100 and generate data directed to the environment around vehicle 100. Such data may be communicated to control module 112A.

In various embodiments, sensor module 114 may include one or more sensors and other measuring devices. In some embodiments, sensor module 114 includes one or more of a front sensor array, a back sensor array, one or a plurality of side sensor arrays positioned to face the respective sides of vehicle 100. In an example embodiment, side sensor arrays may be positioned to face at least forty-five degrees from the front of vehicle 100. Such sensor arrays may include one or more various sensors for receiving visual, audio, and/or other input to be utilized by onboard computer. As such, sensor arrays may operate to receive information from various areas surrounding the vehicle 100, up to and including three hundred sixty degrees around the vehicle 100.

In various embodiments, the sensor arrays may provide a Light Detection and Ranging (LIDAR) system to provide accurate 3-dimensional (3D) information on the surrounding environment. Using this data, control module 110A may implement object identification, motion vector determination, collision prediction, and vehicle avoidance strategies. The LIDAR unit may be well-suited to provide a 360° view by using a rotating, scanning mirror assembly in sensor module 114.

LIDAR provides raw information using high-speed, high-power pulses of laser-light that are timed with the response of a detector to calculate the distance to an object from the reflected light. An array of detectors, or a timed camera, can be used to increase the resolution of the 3D information. The pulse is very short to enhance depth resolution, and the resulting light reflections are used to create a 3D point-like "cloud" that is analyzed to transform the data into volume identification and vector information. The transformed result is then used to calculate the vehicles' position, speed, and direction relative to these external objects, to determine the probability of collision, and instruct appropriate action, if needed.

Sensor module 114 may extend upwards from chassis 108. The elevated position of sensor module 114 may be configured to place the sensors at an advantageous height to sense and detect objects along a designated route. For example, by placing the sensor module at an approximate height of between three to five feet, the sensor arrays may be able to detect both bicycles and automobiles and other vehicles commonly found on roads or sidewalks, as well as adult and children pedestrians along walkways. Since vehicle 100 may interact with human operators or customers for transport of order items, placing the sensor module at a suitable height will improve detection and recognition of humans.

The sensor module may also be able to detect lower objects or and obstacles at the preferred height. However, in some embodiments, the sensor module may be positioned at any desired height, which may be greater than five feet or lower than three feet. For example, additional sensor arrays may be positioned on lower portions on vehicle 100. Such sensors may be used to improve detection of lower objects, such as curbs or lane lines. For example, radars may be built into the front bumper and other sides of the vehicle 100 to supplement a LIDAR system in functions such as parking, lane changing, or in high traffic areas.

Video images may provide details for a human operator but are also suitable as an input parameter for highly autonomous driving. In some embodiments, the sensor arrays on sensor module 114 may comprise video cameras to receive visual information for an operator during remote control of the vehicle 100. Such visual information may also be processed by the onboard computer to recognize objects, such as determining lane lines or sensing objects or markers on the road, for example. In some embodiments, motion tracking processing may be implemented to recognize various objects based on the detected movement. Object recognition may also be implemented such that the vehicle 100 may be configured to follow a particular object. Video or still images captured by cameras in the sensor modules may also be used for facial recognition to authenticate operators or customers.

A combination of two-dimensional and three-dimensional imaging may be implemented with image stitching and other processing to provide a 360° view. In some embodiments, the video cameras may be semiconductor charge-coupled devices (CCD) or active pixel sensors in complementary metal-oxide-semiconductor (CMOS) image sensors. Mono and stereo cameras may be used in conjunction with radar systems to provide a precise evaluation of speed and distance as well as the outlines of obstacles and moving objects. Radar sensors for short-range (24 GHz) or long range (77 GHz) may be located in the front and back of the vehicle 100 to monitor traffic. These can monitor ranges from a centimeter up to a few hundred meters.

In some embodiments, sensor arrays in the sensor modules may include ultrasonic sonars, laser scanners, or other suitable sensor types. In some embodiments, sensor module 114 may further include taillights to signal direction changes or other functionalities. Additional signal lights may be located on the body of vehicle 100 for increased visibility and functionality.

Control module 112A may additionally receive such data and determine instructions for operation of drive modules 102A and/or 102B. For example, control module 112A may provide instructions to accelerate, brake, or turn the wheels of drive modules 102A and/or 102B based on the data from sensor module 114. The control module may include various software nodes or applications such as a planner module and controller module for processing sensor data, determining a motion plan, and converting the motion plan into CAN signals to the various ECU systems.

Vehicle 100 may alternatively or additionally be controlled by an operator via remote control. In some embodiments, sensor module 114 may provide visual, audio, or other information to a user device, such as a computer device. As another example, the user device may include wearable goggles worn by the operator. The operator may obtain surround views of the area surrounding vehicle 100 by using a remote control to pan a moveable camera in the sensor module. In some embodiments, an operator may view the surroundings by turning his head to view a corresponding location around the vehicle 100. In some embodiments, the goggles may provide augmented reality or virtual reality views of the surroundings and provide additional information to the operator.

In some embodiments, a route for vehicle 100 may be determined in real-time. In some embodiments, vehicle 100 may travel along a fixed predetermined (constrained) route to and from assigned locations. Furthermore, control module 112A may comprise a location and movement sensors, such as a global positioning system (GPS), as well as an inertial measurement unit (IMU) to supplement the GPS with inertial guidance which require no external signals. Such IMU may include Micro-Electro-Mechanical Systems (MEMS) based gyros and accelerometers, spinning-wheel gyros, or a combination thereof. In some embodiments, sensors such as an IMU may also indicate the roll, pitch, and yaw positions of vehicle 100. In some embodiments, control module 112A may also be configured to measure and manage power requirements to control power, overall consumption, and thermal dissipation.

In various embodiments, control module 112A may include a user interface 116. User interface 116 may receive a user input. Such user inputs may be inputs entered through a keyboard or a touchscreen or an audio, visual (e.g., detected by one or more cameras), or other such inputs. User inputs may indicate a desired operating mode of vehicle 100, directions and/or destinations for vehicle 100, category of cargo carried by vehicle 100, and/or other instructions. Control module 112A may provide different instructions based on the user inputs, as described herein. Therefore, a user may indicate that vehicle 100 is carrying cargo that can easily spill, such as soup, and, thus, control module 112A may accordingly operate vehicle 100 with lower amounts of acceleration and cornering forces. Various techniques for controlling vehicle 100 by control module 112A are further described herein.

Cargo may be contained within cargo module 110A. Cargo module 110A may include one or more openings or doors that allow for cargo to be inserted into cargo module 110A. In various embodiments, cargo module 110A may include features to receive pre-determined containers. That is, containers for cargo may be of one or a plurality of containers of one or more a plurality of shapes. Cargo module 110A may include features that receive and hold containers of those shapes.

In various embodiments, cargo module 110A may be configured to store various types of perishable goods for transport. In some embodiments, cargo module 110A may be configured with a heating unit to maintain the stored perishable goods at a desired temperature above the ambient temperature. In some embodiments, a cargo module 110A may be additionally, or alternatively, configured with a refrigeration unit to maintain the stored perishable goods, such as ice cream, dairy, or raw meats, at a desired temperature below the ambient temperature.

In various embodiments, the cargo module 110A may be locked or secured. Cargo module 110A may be accessed by a user, such as merchants, couriers, or customers, using authentication information. In some embodiments, the authentication information may include an access code entered at user interface 116. In some embodiments, the access code may be entered at a corresponding client device and transmitted to control module 112A. In some embodiments, the user may use a corresponding client device to scan a barcode, including Quick Release (QR) codes, on vehicle 100 to unlock cargo module 110A. In some embodiments, sensor module 114 may include a camera for scanning a barcode generated at the client device. In yet further embodiments, the client devices may wirelessly communicate with vehicle 100 to unlock and access cargo module 110A such as via Wi-Fi, Bluetooth®, or RFID. In some embodiments, the system may utilize wireless beacons to unlock the storage compartment when it is determined that vehicle 100 has arrived at a particular location, such as a merchant location or depot. In some embodiments, a user may be authenticated via facial recognition by capturing and analyzing an image of the user via a camera or other sensor of vehicle 100.

FIG. 1B illustrates another automated perishable goods delivery system, in accordance with one or more embodiments. FIGS. 1A and 1B illustrates different embodiments of an autonomous vehicle (AV). In FIG. 1A, sensor module 114 may be disposed above control module 112A. Control module 112A may form a mast, or a portion thereof, from which sensor module 114 is mounted at or near the top. Such a mounting position may allow sensor module 114 to have longer ranges. Due to the mast configuration, cargo module 110A in FIG. 1A is disposed forward of the mast. Such a configuration may allow for cargo module 110A to be removed as a complete unit.

In FIG. 1B, control module 110B and sensor module 114 may be mounted on top of cargo module 110B. Accordingly, cargo module 110B may be as long as the entire length of vehicle 100. With control module 112B and sensor module 114 disposed above cargo module 110B, control module 112B and sensor module 114 may be separately attached onto cargo module 110B, as a control and sensor module. Alternatively, cargo module 110B may be removed as a complete unit with control module 110B and sensor module 114 attached. As such, cargo module 110B may include electrical power and/or data connections. Connecting cargo module 110B to chassis 108 may thus include connecting the electrical power and data connections of cargo module 110B to chassis 108.

Figure 2:
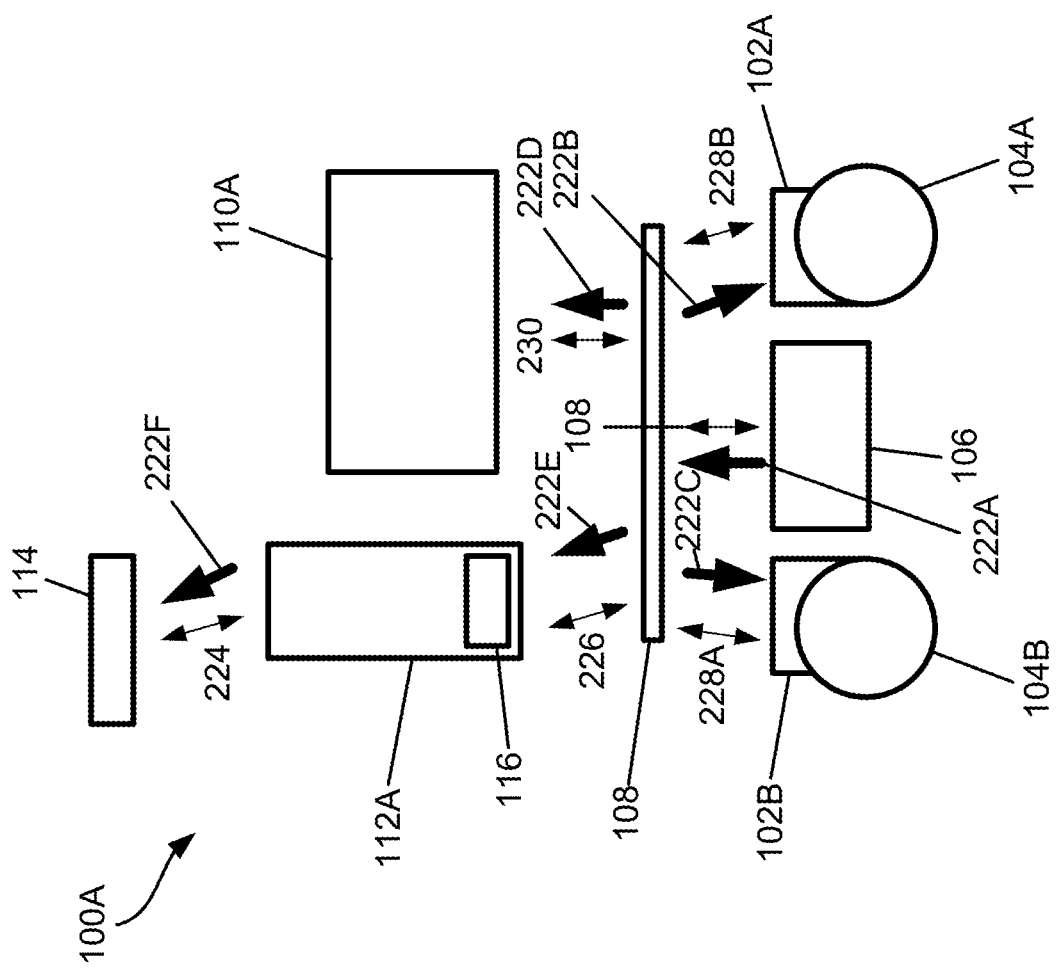
FIG. 2 illustrates a representation of various components of an automated perishable goods delivery system and data flow between the components, in accordance with one or more embodiments.

Accordingly, data may be communicated and electrical power may be provided between various modules of vehicle 100. FIG. 2 illustrates a representation of various components of an automated perishable goods delivery system and data flow between the components, in accordance with one or more embodiments. FIG. 2 illustrates an exploded component view of vehicle 100A.

FIG. 2 illustrates that electrical power 222A may be provided from battery module 106 to chassis 108. Chassis 108 may then accordingly provide electrical power 222B-E to drive modules 102A and 102B, cargo module 110A, and control module 112A, respectively. As such, chassis 108 may include circuitry that provides power to the modules and one or more electrical power connectors configured to interface with corresponding connectors within the modules. Chassis 108 may, accordingly, include components that effectively function as a bus bar to the various modules of vehicle 100. For example, the chassis may be implemented as a CAN bus to effectively communicate with various ECUs.

In certain embodiments, control module 112A may provide electrical power 222F to sensor module 114, but other embodiments may also include chassis 108 providing electrical power to the sensor module. Electrical power 222A-F may power various components of vehicle 100 such as electrical motors, steering mechanisms, processors, sensors, temperature control systems (e.g., for cargo module 110A), and other such systems.

Additionally, data can be communicated between the various modules of vehicle 100. Similar to electrical power, chassis 108 may communicate data from one module to another. Thus, for example, data 224 (e.g., sensor data) may be communicated between sensor module 114 and control module 112A. Furthermore, data 230 may be data readings from or operating instructions to cargo module 110A, as described herein.

Data 226 can be communicated between control module 112A and chassis 108. Data 226 can include, for example, data from one or more sensors of drive modules 102A and/or 102B (e.g., from yaw or wheel slip sensors), data from battery module 106 (e.g., battery level data or battery temperature readings), instructions for operation of drive modules 102A and 102B (e.g., for operating motors and/or steering mechanisms of drive modules 102A and 102B), data readings from within cargo module 110A (e.g., temperature readings or thermal camera readings), data for operation of cargo module 110A, and/or other such data. Data 228A and 228B may be communicated between chassis 108 and drive modules 102A and 102B, respectively. Data 228A and/or 228B may include such sensor readings and operating instructions as described herein. Thus, in certain embodiments, sensor readings may be communicated from drive modules 102A and/or 102B as data 228A and/or 228B to chassis 108 and then from chassis 108 to control module 112A as data 226. Chassis 108 may thus be an intermediary for the data. In various embodiments, the data 224, 226, 228A, 228B, and 230 may be data communicated through wired connections and/or data communicated through wireless connections (e.g., data communicated through Bluetooth® communications).

Operating instructions for drive modules 102A and/or 102B communicated through data 226, 228A, and/or 228B may include instructions for operation of motors of drive modules 102A and/or 102B (e.g., to provide drive to vehicle 100). In other embodiments, such data may include instructions for commanding drive modules 102A and/or 102B to brake. In various embodiments, as described herein, braking of drive modules 102A and/or 102B may be performed through conventional brakes (e.g., disc brakes) and/or through electric motor braking (e.g., by causing electric motors to be in an energy regeneration mode).

In various embodiments, the modules described herein may be sealed for protection against the environment. For example, the modules may meet Ingress Protection ratings, such as IP65 (dust tight) ratings.

The modular nature of the various modules allow for the modules to be assembled, tested, and tuned separately from each other and from vehicle 100 as a unit. Additionally, the various modules may be quickly replaced while vehicle 100 is in service or within a service facility. In various embodiments, the modules may be coupled to chassis 108 with fasteners that do not require special tools or a robotics lab to manipulate or remove. In certain such embodiments, coupling techniques that do not require tools to manipulate, such as catches or toggle clamps, may be used to allow for service without tools at all. Modules can be removed and replaced as a unit and defective modules can be sent to an off-site service center for repair. Such a configuration allows for vehicle 100 to be available for a greater amount of time and minimizes downtime due to service.

Figure 3:
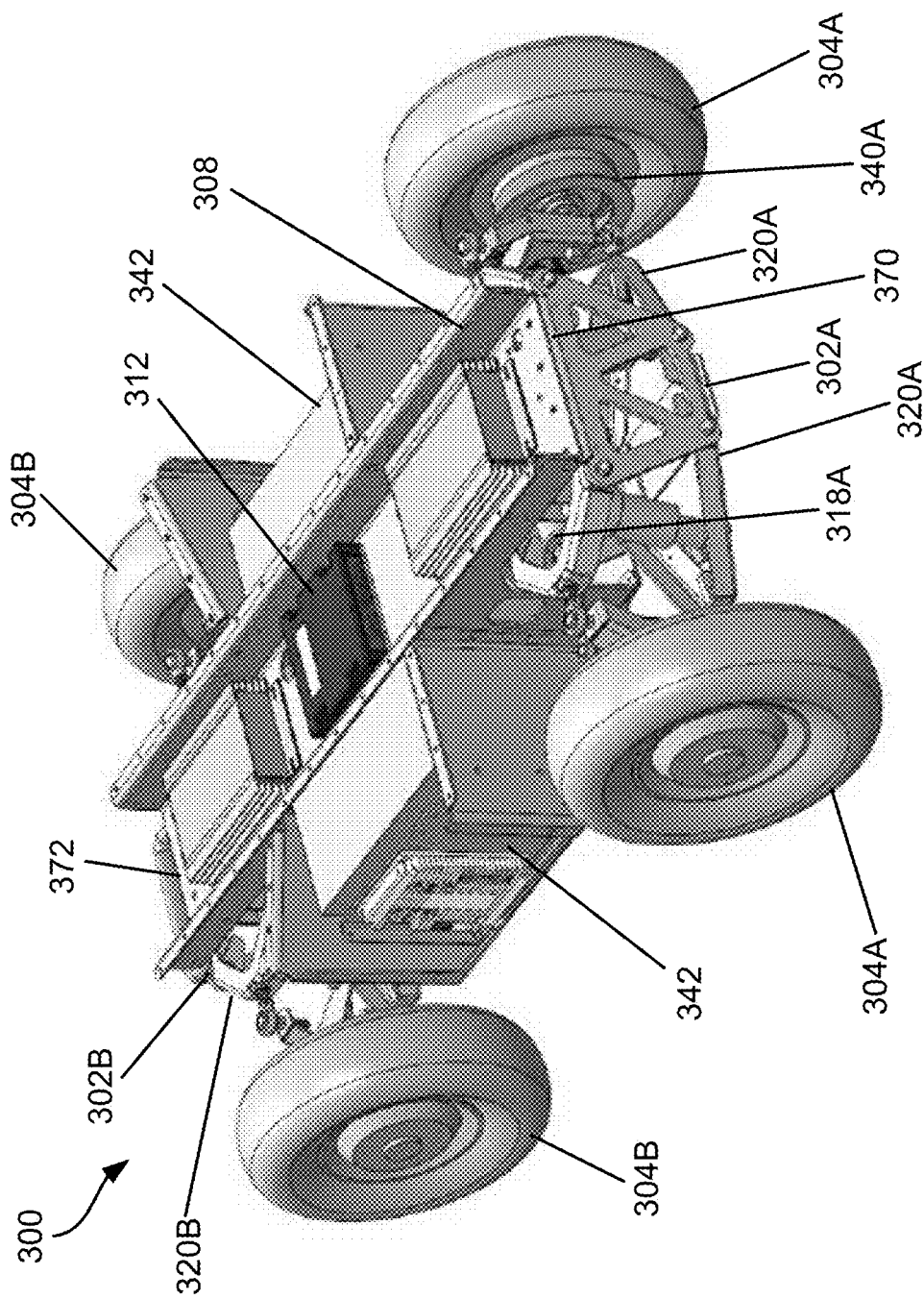
FIG. 3 illustrates a perspective view of a propulsion system of an automated perishable goods delivery system, in accordance with one or more embodiments.

FIG. 3 illustrates a perspective view of a propulsion system of an automated perishable goods delivery system, in accordance with one or more embodiments. FIG. 3 illustrates propulsion system 300 of a vehicle that includes control module 312, chassis 308 and drive modules 302A and 302B. Control module 312, chassis 308 and drive modules 302A and 302B are equivalent to control module 112A or 112B, chassis 108, and drive modules 102A and 102B of FIGS. 1A, 1B, and 2. Chassis 308 further includes a battery housing 342 on either side configured to receive battery modules such as battery module 106 described herein. Chassis 308 may be, for example, an extruded, sheet metal, composite, or machined chassis. Chassis 308 may be formed of one or a plurality of parts. In various embodiments, various parts of chassis 308 may be bonded, welded, mechanically fastened (e.g., riveted or bolted together), or otherwise attached to form the complete chassis 308.

In the example shown in FIG. 3, control module 312 is positioned at the center of chassis 308. However, the control module may be positioned at any suitable location on the chassis based on the desired configuration. Furthermore, as shown, drive module 302A is disposed on a first end 370 of chassis 308 while drive module 302B is disposed on a second end 372 of chassis 308. As such, drive modules 302A and 302B are disposed on opposing ends of chassis 308.

Mounting drive modules 302A and 302B on the ends of chassis 308 may allow for vehicle 100 to be operated in both forward and backward directions at the same speeds. In certain such embodiments, drive module 302A may, for example, power vehicle 100 when vehicle 100 is traversing in a direction towards first end 370 and drive module 302B may power vehicle 100 when vehicle 100 is traversing in a direction towards second end 372, or vice versa. Other embodiments may include drive modules 302A and 302B both providing power at the same time for vehicle 100 (e.g., providing four wheel drive).

Drive modules 302A and 302B may be disposed in mirrored orientations. The mirrored orientations may allow for better maneuverability of the vehicle by, for example, allowing for the wheels of drive modules 302A and 302B to be steered in opposing directions while maintaining the desired level of Ackerman steering geometry. Furthermore, in such mirrored orientations, motors 340A and 340B (not shown, but mounted on drive module 302B and equivalent to motor 640B in FIG. 6), may be configured to operate at full speeds in a plurality of drive directions (e.g., forward and backward). Such motors may, thus, be operated full speed regardless of which end drive modules 302A and/or 302B are installed at, allowing for vehicle 100 to be operated at full speed in four wheel drive mode and also to provide full electronic braking. In other embodiments, the motors may be configured to provide power in primarily one direction and drive modules 302A and 302B may be disposed in mirrored orientations so that at least one drive module may provide motive power.

Drive modules 302A and 302B may also include steering mechanisms that can orient wheels 304A and 304B of drive modules 302A and 302B in a desired direction. In certain embodiments, steering mechanisms of one or both of drive modules 302A and/or 302B can be locked. As such, one steering mechanism may be locked and another may be movable to allow for steering with only one axle. Greater stability can accordingly be imparted to vehicle 100. Additionally, the steering mechanisms of a plurality of drive modules may be operated at the same time. Such a configuration may increase the maneuverability of vehicle 100. For example, orienting a plurality of steering mechanisms in the same direction, by turning the wheels turning in the same direction, may allow for greater stability of vehicle 100 while maneuvering. Orienting a plurality of steering mechanisms in different directions, by turning the wheels turning in different directions, may allow for greater maneuverability of vehicle 100 (e.g., a tighter turning circle).

In various embodiments, drive module 302A may include wheels 304A, suspension 320A, steering mechanism 318A, and motor 340A. Drive module 302B may include corresponding components. In certain embodiments, motor 340A may be disposed within wheel 304A (e.g., disposed within a center portion of the wheel). Motor 340A may be configured to accelerate or decelerate the vehicle. Thus, motor 340A may be a braking system as well. In various embodiments, each wheel 304A may contain a motor 340A.

Operational Modes

In various embodiments, the autonomous vehicles (AVs) described herein may operate under a hybrid autonomy system which arbitrates between an operator's control inputs and the autonomous capabilities of the planning and controls system stack of the AV. The architecture of such hybrid autonomy system may provide more well-defined modes of interaction for the operator, safe operation of the AV that is robust to potential latency variation, and allows for the operator to fill in for deficiencies in current autonomy systems. As such, the systems and methods described herein provide an efficient hybrid autonomy stack to enable an operator to adequately define or redefine the planned motion of the AV in order to manage situations that are beyond current autonomous capabilities. In various embodiments, the AV may have different operation modes, including a hybrid autonomy mode and a direct driving mode. In various embodiments, an operator may be provided selections at an operator device to alternate between operation modes.

Figure 4:
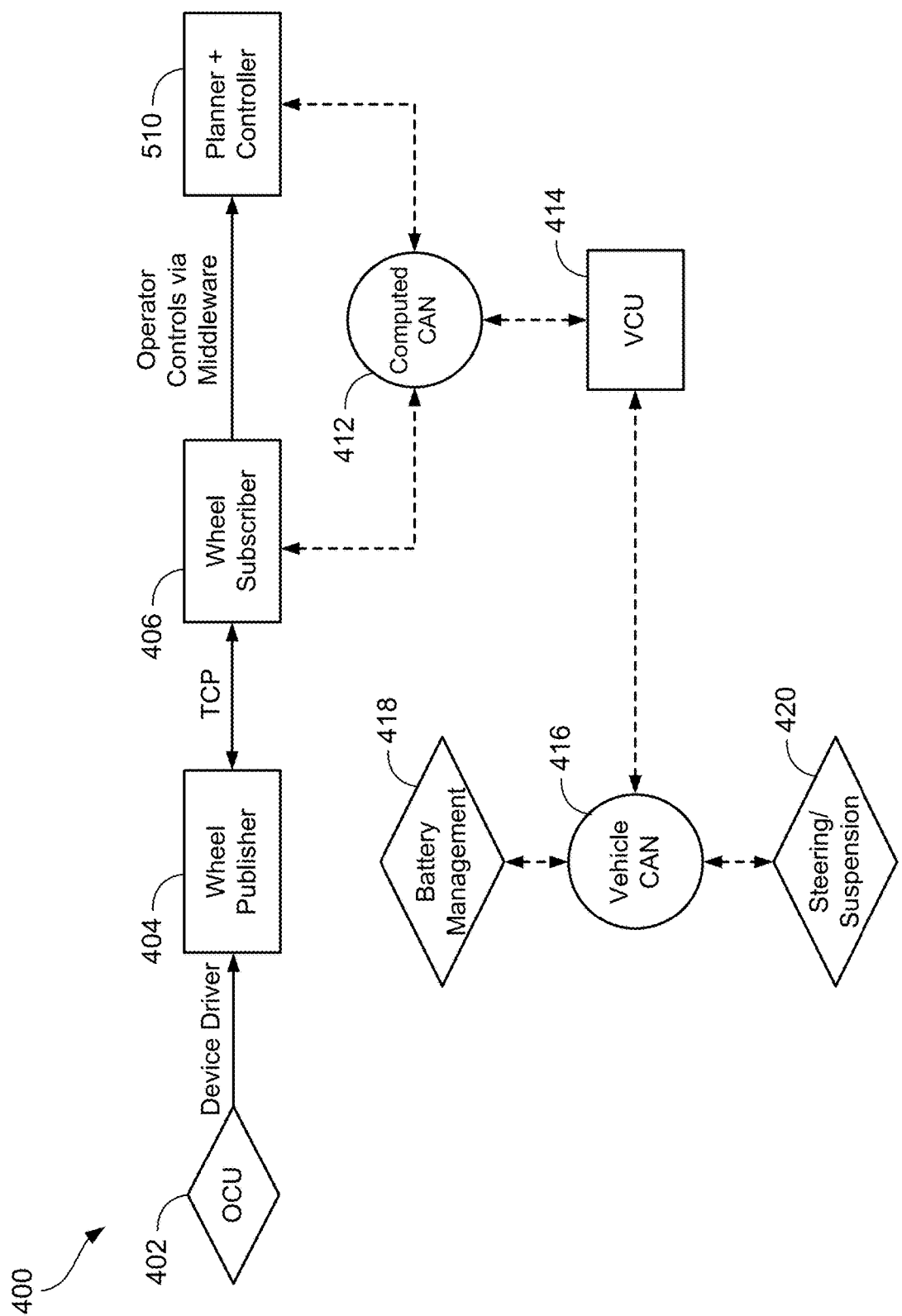
FIG. 4 illustrates an example teleoperation stack system for an automated perishable goods delivery system, in accordance with one or more embodiments.

With reference to FIG. 4, shown in an example teleoperation stack system 400 for an automated perishable goods delivery system, in accordance with one or more embodiments. The teleoperation stack system may be implemented during direct driving mode or hybrid autonomy mode. Teleoperation stack system 400 may include operator control unit (OCU) 402, wheel publisher 404, wheel subscriber 406, and vehicle control unit (VCU) 414. Also depicted is planner and controller module 510, which is a component of the hybrid autonomy system 500 further discussed below.

In various embodiments, operator control unit (OCU) 402 is an operator device, or client device, which may be configured to receive input from a user, or operator, to control movement and other functions of the AV. For example, OCU 402 may be a computing device with an input or control components such as a user interface, touch screen, joystick, steering wheel, pedals, switches, or any combination thereof. OCU 402 may further include display screens for displaying camera feed from the AV. In some embodiments, a display headset or wearable goggles may be implemented as a display of the OCU. As an example, an operator may provide steering and motion input at OCU 402 for the AV. As such, OCU 402 may further include a set of actuators, such as a steering wheel, joystick, throttle and brake controls (i.e., pedals), and other inputs to control the AV. Inputs received at the OCU 402 are transmitted to wheel publisher 404, which then transmits the input to wheel subscriber 406.

In various embodiments, publisher 404 and subscriber 406 are applications that send and receive messages (publications) using the publish/subscribe method of messaging. Publishers and subscribers may be decoupled from one another so that publishers may not know the destination of the information that they send, and subscribers may not know the source of the information that they receive. Publisher 404 and subscriber 406 may represent applications operating within the OCU and an AV control module, respectively.

For example, wheel publisher 404 may be a software node on the OCU that receives operator control commands and relays them to wheel subscriber 406 at the AV over a wireless network, such as over a Transmission Control Protocol (TCP) link. The control commands may be transmitted via a device driver corresponding to the particular control input used (i.e., throttle, pedal, joystick, etc.). Wheel publisher 404 may also receive vehicle status messages, including data such as vehicle telemetry, from wheel subscriber 406 over the same link.

Wheel subscriber 406 may be a software node on the AV control module that publishes the operator control commands received from the OCU. When operating in the direct driving mode, the wheel subscriber may publish the control commands via CAN directly to the vehicle control unit 414 (VCU) or other low-level controllers. As used herein, low-level controllers refer to embedded processor systems or software nodes running on VCUs or ECUs. In FIG. 4, CAN signals are depicted as dashed lines.

However, in some embodiments, publisher 404 may be run in a control module of the AV. In such a configuration, operator commands may be transmitted from the OCU to the publisher at the AV via the wireless network link, and the publisher and subscriber may communicate via various middleware systems, such as robot operating system (ROS), robot operating system 2 (ROS 2), and APEX OS, for example. In some embodiments, the wheel subscriber node publishes a middleware message having a C style struct definition for message type. Example middleware messages include: double steering angle; double throttle_pct, double brake_pct, bools obstacle_disregard, and double latency_ms. However, various other programming languages may be implemented depending on the requirements of the particular middleware systems.

System 400 also shows planner and controller module 510 which may be implemented in the hybrid autonomy mode of operation, further described with reference to FIG. 5. In the hybrid autonomy mode, the wheel subscriber may publish the control commands to the planner or controller at module 510 via TCP or other middleware systems (wired or wireless connections). In some embodiments, module 510 represents a combined planner node and a controller node. However, it should be recognized that the planner node and the controller node may be separate modules in some embodiments. The planner may be a software node at the AV control module that consumes processed information from sensors, such as camera, LiDAR, and radar, in addition to control commands received from subscriber 406, and uses such information to generate a motion plan for how the AV is to operate in response to operator input and other external stimuli, objects, and signage. The controller may be a software node at the AV control module that receives the motion plan from the planner and converts the motion plan to commands for AV operation, such as steering and velocity CAN signals 412.

The computed CAN signal from wheel subscriber 406 (or module 510 in hybrid autonomy mode) is represented at 412. The computed CAN signal is then provided to vehicle control unit (VCU) 414. In various embodiments, the VCU is a software node or embedded processor configured to translate information received from the publisher and subscriber into vehicle CAN signals 416 (power output), and communicate the vehicle CAN signals (power output) directly with the ECU subsystems, such as actuators of the vehicle (i.e., motors and steering/suspension 420) and the battery management system 418. Battery management system 418 manages charging and power output of the battery module to various components. For example, appropriate amount of power may be supplied to the wheels of the AV to reach a desired speed based on received CAN signals. As another example, the power output signals 416 may dictate how much power is supplied from the battery management system to the steering mechanism to cause a desired amount of adjustment in wheel positioning. In some embodiments, the VCU may sit on the control module of the AV. However, in some embodiments, each subsystem, such as steering or battery management may include a corresponding VCU functioning as a low-level controller or ECU.

In some embodiments the VCU also receives and transmits messages to the wheel subscriber, the controller, or the planner. In some embodiments, the VCU may also receive and transmit messages to a safety remote controller (SRC). Such SRC may be a remote control used by a chaperone in close proximity to the AV to ensure the AV is operating safely during testing.

Figure 5:
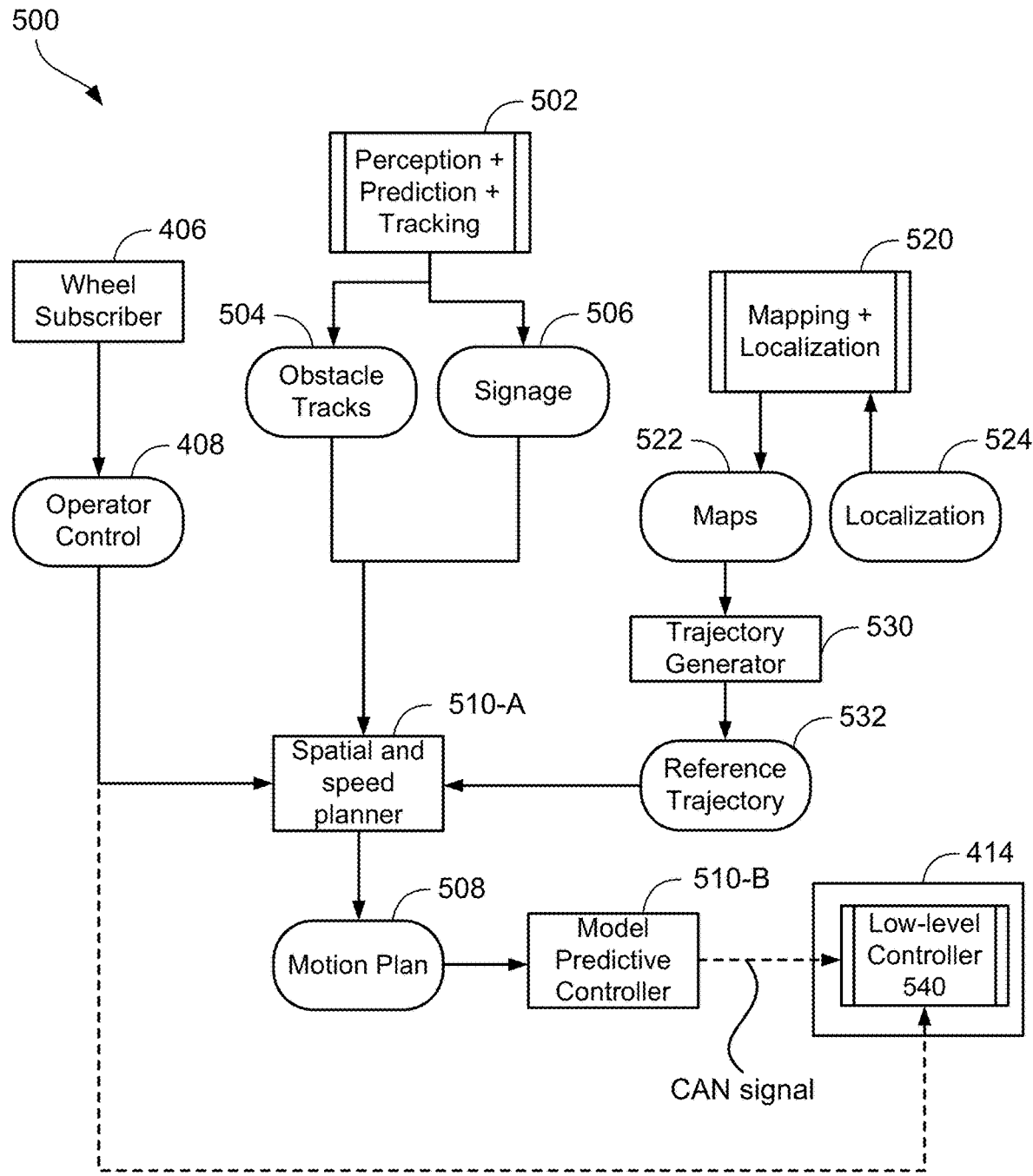
FIG. 5 illustrates an example hybrid autonomy stack system for an automated perishable goods delivery system, in accordance with one or more embodiments.

With reference to FIG. 5, shown is an example hybrid autonomy stack system 500 for an automated perishable goods delivery system, in accordance with one or more embodiments. As depicted, system 500 comprises software nodes 502 and 520, planner 510-A, controller 510-B, trajectory generator 530, and low-level controller 540 at VCU 414. System 500 may also include subscriber 406 which transmits operator controls depicted at topic 408. Unless otherwise noted, the various components shown in FIG. 5 may communicate via one or more middleware systems.

Planner 510-A is a spatial and speed planner. Controller 510-B is a model predictive controller. Planner 510-A may be the planner at module 510 and controller 510-B may be the controller at module 510. As shown here, planner 510-A and controller 510-B are depicted as separate modules. In various embodiments, planner 510-A is a set of software nodes that generate a motion plan (topic 508) for the positions and the velocities that the AV should assume based on the presence of motion of other actors and objects (topic 504) and identified signage (topic 506). Planner 510-A may also generate the motion plan based on a reference trajectory (topic 532) from trajectory generator 530. Planner 510-A may also receive operator input (topic 408) received from the OCU to generate or adjust the motion. As previously described, wheel subscriber 406 may transmit operator controls (topic 408) to planner 510-A and/or VCU 414 (as CAN).

In some embodiments, nodes 520 are a set of software nodes at the control module for mapping and localization. Nodes 520 may generate information about the AV's relative position and orientation with respect to the external environment and world. Software nodes 520 may intake localization topic 524 including the AV's position and orientation, which may be determined via GPS, and generate semantic map information (maps topic 522). Maps topic 522 is transmitted to trajectory generator 530, which is a software node that consumes localization and semantic map information to generate reference trajectory for the AV to follow (topic 532). This reference trajectory may then be modified by the planner as necessary based on processed sensor data from perception, prediction and tracking nodes 502.

In various embodiments, nodes 502 are a set of software nodes at the control module for perception, prediction, and tracking. Nodes 502 may consume data from sensors such as cameras, LiDAR, and radar to generate real-time perception data about external stimuli, (actors and objects) in the environment, shown at obstacle tracks topic 504. Accordingly, obstacle tracks topic 504 may include object recognition data and information about position, size, velocities, and predicted positions of identified actors, objects, and stimuli in the environment. Nodes 502 may also generate information regarding signage detected recognized in the environment (signage topic 506) including stop signs, traffic lights, crosswalks, and the like.

Nodes 502 may identify and classify various objects within an image frame via various trained machine learning algorithms. In some embodiments, semantic segmentation of image frames is performed by a neural network system of node 502 that has been trained to identify and label pixels according to a corresponding category or class. In some embodiments, the neural network system described herein is a convolutional neural network. In some embodiments, the neural network may comprise multiple computational layers.

The neural network may be trained to label every pixel in the image with a particular category label (e.g., person, car, sky, road, etc.). Such training may be done by inputting training pairs comprising a training image and a corresponding label map. The training image may be input into the neural network as a tensor to be processed through the various layers of neural network for labeling. The image may be input as a third-order tensor, for example. In some embodiments, the neural network is trained with a softmax loss on pixels after aggregating outputs from convolutional and pooling layers in a feature map that results in a downsample from the original image size. The result may then be compared to the predetermined label map corresponding to that training image. The parameters of the neural network may then be updated. In some embodiments, the parameters are updated using a stochastic gradient descent. In some embodiments, an instance segmentation model may be implemented to distinguish between separate objects classified with the same object class.

Once the neural network is sufficiently trained, it may be used to label pixels in new image sequences. Such image sequences may be images frames corresponding to video data captured by the AV sensory array. Each image frame of the video data may be input into the neural network to produce a corresponding feature map. In some embodiments, the neural network may be trained for k object classes (e.g., person, car, bicycle, sky, etc.) to produce a feature map that has k channels where channel 'j' represents the probability of each pixel being of object class T. In various embodiments, object classes may include, but are not limited to, the following object classes: buildings, grass, trees, sky, roads, pedestrians, airplane, water, cars, bicycles, shopping bags, signs, birds, dogs, cats, and dogs. In some embodiments, color and other image data may be layered onto three-dimensional pixels obtained via LiDAR before semantic segmentation is performed. In some embodiments, image data and LiDAR data may be separately passed as tensors through neural network algorithms before synthesizing the results into a final feature map.

In an example embodiment, the neural network may comprise a series of convolution layers and pooling layers. In some embodiments, one or more convolution layers are followed by a pooling layer and the output of each layer is input into the subsequent layer. In some embodiments, each pooling layer is followed by a series of convolution layers which take the downsampled output of the pooling layer as input. In some embodiments, the neural network also implements rectified linear units (ReLU) along with one or more convolutional layers. However, it should be recognized that not every convolution layer may be followed by a pooling layer. The neural network may aggregate outputs from pooling and convolutional layers in a feature map resulting in a downsample from the original image size. For example, average pooling or max pooling layers may be implemented in the neural network. The benefit of aggregating feature maps from different layers of the neural network allows the use of both finer scale and coarser scale details to produce these probability maps. For example, using only lower layers or only higher layers would produce sub-optimal outputs.

In certain embodiments, the output of the final convolution layer or pooling layer of the downsampling portion is input into a flattening layer to flatten the output into a column vector of desired dimensions. In some embodiments, the output of the final convolution layer or pooling layer of the downsampling portion is input into one or more fully connected layers. These fully connected layers may also implement ReLU as an activation function.

In some embodiments, the image segmentation models follow an encoder/decoder structure which upsamples the feature representations into a full-resolution segmentation map. Various methods for upsampling may be implemented, such as nearest neighbor upsampling, "bed of nails" upsampling, max unpooling, and transpose convolutions. Concatenation layers and skip connections may also be implemented to increase detail in order to reconstruct accurate shapes for segmentation boundaries. In some embodiments, skip connections from earlier layers in the network (prior to a downsampling operation) may be implemented to reconstruct accurate shapes for segmentation boundaries and recover more fine-grain detail during upsampling. In some embodiments, a U-Net architecture which consists of a contracting path to capture context and a symmetric expanding path that enables precise localization.

In some embodiments, the training of the neural network may be performed at a centralized server system in a global or cloud network. In some embodiments, the training data, such as weights, parameters, and training images may be stored at the centralized server system. The updated weights may then be transmitted from the centralized server system to a local computing device at the AV for more efficient image processing. In some embodiments, the parameters of the neural network may be periodically updated at the centralized server based on new training data. However, in some embodiments, training or updates of the neural network may be performed at the local computing device of the AV.

The described computational layers provide several examples of a neural network that can be used for semantic segmentation of images to classify objects. It should be recognized that the different layers in the neural network architecture may be varied to achieve the desired performance goals, and that a neural network implemented with the described systems may include fewer or additional computational layers known in the art.

Machine learning algorithms of perception, prediction, and tracking nodes 502 may similarly be trained and configured to recognize and detect various traffic signs and signals such as based on the shape of the signage and symbols. Nodes 502 may further use proximity sensors, such as LiDAR and IMUs, in conjunction with the object recognition data to determine distance and trajectory of the detected objects.

Such data may be received by the planner in real-time or near real-time to adjust the predetermined reference trajectory in order to avoid obstacles and safely navigate the AV to the destination during operation in hybrid autonomy mode. In some instances, operator controls (topic 408) may be received at the planner during hybrid autonomy mode. As will be further discussed, an operator may monitor the progress of the AV and transmit control inputs as necessary to modify the reference trajectory. Based on the aforementioned transmissions, the planner generates a motion plan (topic 508), which may include a set of computed positions and velocities.

Planner 510-A then transmits the generated motion plan 508 to controller 510-B. Controller 510-B may be a software node that consumes the motion plan 508 and publishes steering and velocity command references for low-level controller 540 via CAN. As previously described, low-level controller 540 is a set of software nodes at VCU 414 that consumes the steering and velocity command references from controller 510-B to generate power output or torque commands for motors as well as steering motors. In some embodiments, the low-level controller may be the ECU of a particular subsystem. In the direct driving mode, the low-level controller may switch to teleop and the operator is able to control the AV directly via CAN commands from the OCU (operator control unit). CAN signals are depicted as dashed lines in FIG. 5.

As described, the AV systems may alternate between direct driving mode (FIG. 4) and hybrid autonomy mode (FIG. 5). When in direct driving, the operator controls the AV via commands through the various input and control components at the OCU and using visual feedback from video and images captured and transmitted from the AV. An operator may be required to be available during operation of the AV at all times during direct driving. In some embodiments, direct driving may require fast reliable network connectivity between the OCU and the AV. As such, direct driving mode may be implemented during low latency connection. Latency may refer to the time it takes for a request or message to travel from the sender to the receiver and for the receiver to process that request. Higher latency may increase the amount of delay between the obtaining sensor data at the AV and receipt of the data at the OCU. For example, acceptable operation conditions during direct driving may require network speeds greater than 24 gigabytes per second (Gbps), which transmits information, such as sensor and video data, at a speed that provides sufficient time for the operator to react to obstacles in the transmitted video. Direct driving mode may also require faster frame rates of video, such as 1 frame per second (FPS) or more. Moreover, a low latency connection may also allow for operator input to be transmitted to the AV at an adequate speed for seamless control. For example, direct driving may be done over a 5G network connection or.

However, disruptions in network connectivity may cause data transfer rates and/or frame rates between the OCU and the AV to drop below adequate levels for reliable operation in existing systems. Furthermore, low latency connections require increased data usage as compared to higher latency connections, which increases costs and processing requirements. In various embodiments, operation in hybrid autonomy mode may be implemented over high latency network connectivity.

As such, operating in the hybrid autonomy mode for a majority of the time may be desirable. Operating via high latency network connectivity provides several advantages. First, it is robust to potential latency variation. For example, input or video data may be transmitted with some lag time without hindering operational performance. Additionally, hybrid autonomy may operate at slower frame rates (less than 1 FPS) of video feed for adequate monitoring by operators. Thus, hybrid autonomy may be implemented over a wider range of network connectivity and less data transfer, providing improved performance over low latency connectivity, and sufficient performance during periods of high latency connectivity. Operating at higher latency connections may also drastically reduce data costs and processing requirements.

In some embodiments, hybrid autonomy mode may implement a combination of autonomous driving by the onboard computer along with operator feedback for predetermined decisions. Various levels of autonomy may be implemented. For example, the described AVs may be configured to operate at a level of automation corresponding approximately to level 3 automation, in which the AV takes over all driving functions under particular circumstances. However, in other embodiments, the AV may be configured to operate at levels corresponding to higher levels of automation, such as level 4 or level 5 automation.

The operator interface for hybrid autonomy may be the same as in direct driving mode. In some embodiments, control inputs for hybrid autonomy operation may include longitudinal velocity, lateral offset, angular offset, and obstacle override, among others. With the longitudinal velocity control, the operator is able to modulate the velocity or speed of the AV. For example, the OCU may include a throttle stick or a pedal which may be used to input a desired velocity. In some embodiments, a brake control, such as a stick or pedal, may be used to reduce velocity more rapidly.

With the lateral offset control, the operator is able to set the offset with which the AV tracks a predetermined path of the reference trajectory. For example, if the operator perceives the AV as traveling too closely to an object, such as a curb or sidewalk, the operator may input an offset of 0.5 meters to the left. This will cause the planner to continue the AV along the predetermined path, but at 0.5 meters to the left of the center line of the predetermined trajectory path. In certain embodiments, lateral control input from the OCU is consumed as an input by the planner, and motion plans which conform with the lateral control input are selectively generated. In some embodiments, a maximum allowed offset on either side of the path line may be fixed to provide some constraints on the motion during hybrid autonomy operation. In some embodiments, the current offset may be displayed at the visual interface of the OCU, and a direction of motion may determine whether the offset is to the left or right of the path line. Angular offset controls may also be used to adjust the reference path to create desired curvatures or directional changes in the predetermined path.

The reference path and desired velocity (from topic 408) may be modified above the planner in this way, which allows the planner to retain its ability to use real-time data from modules 502, 520, and/or 530 to monitor and react to moving actors and avoid obstacles. Existing systems may provide operator control inputs directly to the VCU or low level controllers when the operator decides to modify the computer generated motion plan. Such existing systems require constant low latency connectivity to ensure that the operator is reacting on time and that the operator controls are received at the AV in time to carry out the adjustment safely. The described hybrid autonomy systems improves upon existing systems by providing a layer of insulation from latency issues during hybrid autonomy which may arise due to connectivity issues or delayed reactions by the operator. Intervention at a lower layer may be more effectively handled by transmitting operator controls to the low-level controller in direct driving mode.

With the obstacle override control, the operator is able to allow the planner (510-A) to temporarily disregard obstacles observed in the path of the AV. For example, the obstacle override control may be a button or switch (physical or touchscreen). In some embodiments, the obstacle disregard button must be engaged for the planner to operate in this override mode. As soon as the button is no longer engaged, the planner will begin to continue considering obstacles. This functionality allows the operator to deal with anticipated issues with perception due to false detections or inaccurately classified bounding boxes by the perception, prediction, and tracking module(s), particularly in early development or where the machine learning algorithms are being trained. In some embodiments, operation of the obstacle override controls may also be used to train or refine the machine learning algorithms.

Predetermined Depot Routes

In some embodiments, while in the hybrid autonomy mode, the AVs described herein may be implemented to travel predetermined routes between one or more designated locations. For example, AVs may travel predetermined routes between aggregation depots corresponding to predetermined areas of merchants and customers may be implemented in order to streamline activities in the delivery process. Traveling a fixed predetermined route by an AV provides for improved estimated time of arrival (ETA) predictions because potential deviations from route guidance are reduced as compared to a human courier who may vary the travel route from time to time. Since the route is known by the delivery routing system, fewer variables will affect the various ETA predictions for the AV, such as variability among different human operators including decisions, errors, etc. A predetermined route may also reduce processing resources, programming information, and data needed for the onboard computer of the AV. Predetermined routes will also promote safety because other pedestrians and commuters will expect the AV on a particular road and have an increased awareness of such AVs. Additionally, use of AVs may allow for more continuous tracking of location and speed to improve ETA predictions by solving the problem of failure to confirm events by human error.

Figure 6A:
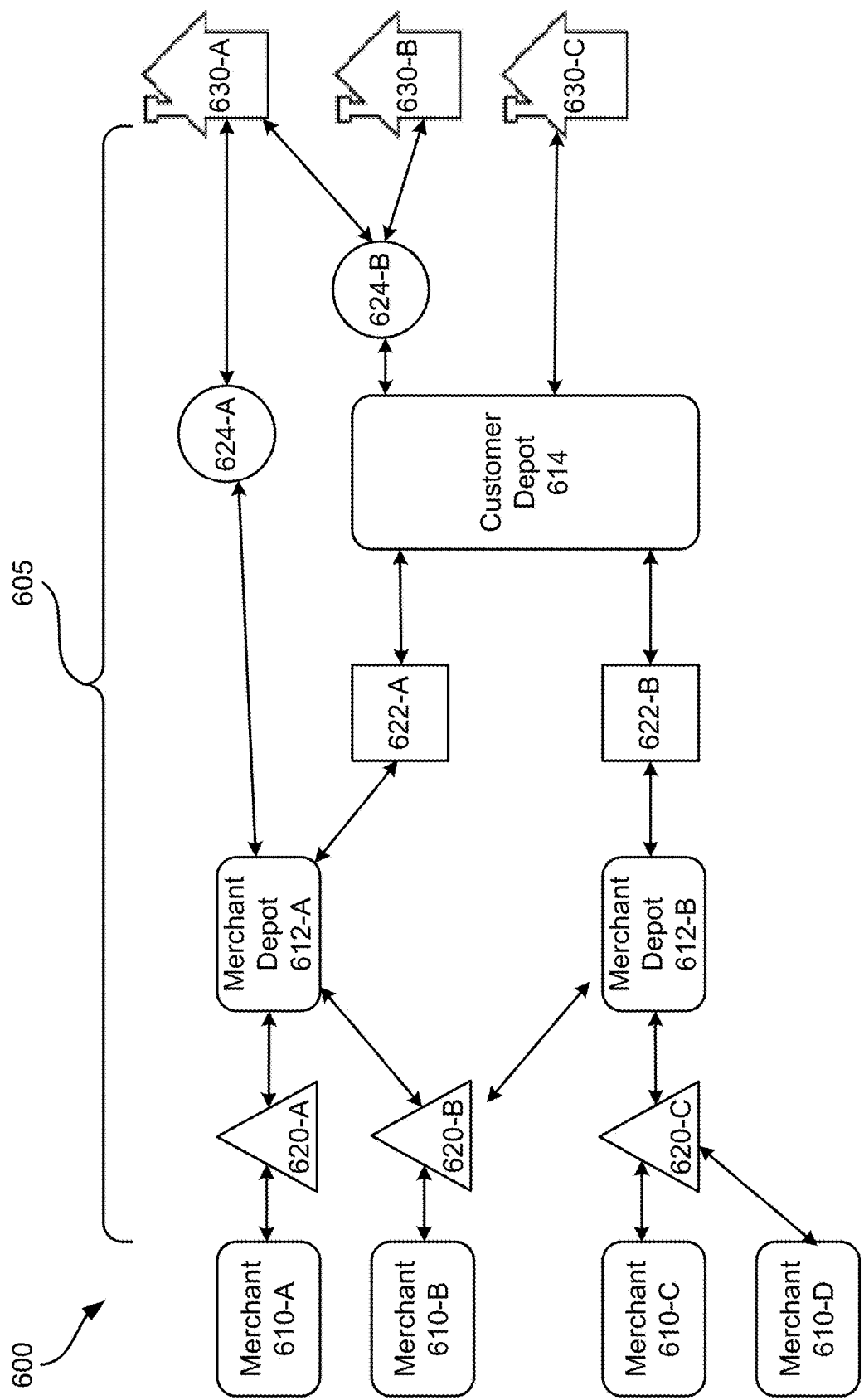
FIG. 6A illustrates an example of a delivery logistics system utilizing multiple aggregation depots for real-time on-demand delivery of perishable goods, in accordance with one or more embodiments.

With reference to FIG. 6A, shown is an example system 600 for a delivery logistics platform utilizing multiple aggregation depots for real-time on-demand delivery of perishable goods, in accordance with one or more embodiments. In various embodiments, as depicted in FIG. 6A, system 600 may utilize one or more aggregation depots assigned to particular areas of merchants and/or customers to further reduce AV travel times and speed up overall delivery of perishable goods. In various embodiments, an aggregation depot may function as a hub for storing orders, batching orders, and routing couriers. As will be explained herein and with regards to FIG. 6A, aggregation depots may be further classified as merchant depots or customer depots.

In particular, system 600 is configured to improve scheduling and other logistics of last-mile delivery routes 605. Last-mile delivery generally refers to the movement of goods from a transportation depot or hub to a final delivery destination, which may typically be a personal residence. However, final delivery destinations may also be commercial locations or public areas. Last-mile delivery may include any of the delivery events described herein, including order creation, order placement, order confirmation by merchant, order completed by merchant, order assignment to courier, courier arrival at merchant, order pickup, courier arrival at customer, and order delivery.

System 600 may include merchants, couriers, and customers. As shown in FIG. 6A, system 600 includes merchants 610-A, 610-B, 610-C, and 610-D, and customers 630-A, 630-B, and 630-C. System 600 may further include couriers 622-A, 622-B, 624-A and 624-B. The couriers described with reference to FIGS. 6A and 6B may correspond to autonomous vehicle (AV) systems discussed herein. In various embodiments, depot couriers 622-A and 622-B are assigned to transport orders between depots, while delivery couriers 624-A and 624-B are assigned to deliver orders to customer locations. In various embodiments, system 600 may include additional or fewer merchants, couriers, and/or customers than shown in FIG. 6A.

System 600 may include aggregation depots corresponding to one or more merchants in a predetermined area. As used herein, aggregation depots corresponding to one or more merchants in a predetermined area may also be referred to as merchant depots or merchant hubs. Each merchant hub may correspond to one or more merchants in a predetermined area. Such predetermined area may have been identified as having high congestion due to limited parking and/or high vehicle or foot traffic.

As depicted, merchants 610-A and 610-B correspond to merchant depot 612-A and merchants 610-C and 610-D correspond to merchant depot 612-B. Merchants 610-A and 610-B may correspond to a first predetermined area, while merchants 610-C and 610-D may correspond to a second predetermined area. In some embodiments, various merchants may be located within a predetermined radius of the corresponding merchant hub. For example, merchant depot 612-A may be within one (1) mile from merchants 610-A and 610-B in the corresponding high traffic area. In various embodiments, the first and second predetermined areas do not overlap. However, in some embodiments, the first and second predetermined areas overlap with one or more common merchants.

In some embodiments, merchants may transport completed orders to corresponding to merchant depots. This may be done with by personnel of the individual merchants. In some embodiments, one or more runners may be assigned to one or more merchants or merchant depots for transporting orders from merchants to the appropriate merchant depot. Runners assigned to travel between merchants and merchant depots will be referred to as merchant couriers. Merchant couriers may be assigned to travel to one or more merchants to pick up orders that have been confirmed as ready and deliver the orders to a designated merchant depot.

In some embodiments, a merchant courier may be assigned to a particular merchant. For example, merchant courier 620-A may be assigned pick up only orders from merchant 610-A, while merchant courier 620-B may be assigned to pick up only orders from merchant 610-B. In some embodiments a merchant courier may be assigned to pick up orders from more than one merchant. For example, merchant courier 620-C may be assigned to pick up orders from merchants 610-C and 610-D. In some embodiments, each merchant courier is assigned to a particular merchant depot. For example, merchant couriers 620-A and 620-B may be assigned to deliver orders to merchant depot 612-A only, while merchant courier 620-C may be assigned to deliver orders to merchant depot 612-B only. However, in some embodiments, a particular merchant courier is assigned to more than one merchant depot. For example, merchant courier 620-B may also deliver orders to merchant depot 612-B. In such examples, a merchant, such as merchant 610-B, may be within multiple predetermined areas corresponding to more than one merchant depot.

In some embodiments, merchant couriers are autonomous vehicles or other robotic devices configured to travel along pedestrian walkways and sidewalks. However, in some embodiments, merchant couriers may be human personnel that travel to and from the assigned merchant on foot, or via other means, including automobile, bicycles, scooters, skateboards, or other powered or unpowered transportation devices, which may more efficiently navigate busy areas with high traffic and congestion.

Once an order makes it to a merchant depot, the order may then be transferred to a delivery courier at the merchant depot for delivery to a customer. For example, delivery courier 624-A is shown delivering an order from merchant depot 620-A to customer 630-A. Personnel at the depot, such as a dispatcher, may oversee the aggregated orders and assign the orders to appropriate couriers. In some embodiments, a delivery routing system may be implemented in the system to automatically determine travel routes and order assignments for couriers. Multiple orders may be aggregated at these merchant depots into batches of one or more orders. In some embodiments, the orders may be grouped into batches based on delivery destination and time of drop off at the merchant depot. A batch of orders may then be assigned to a delivery courier, such as delivery courier 624-A, for delivery to the corresponding customers, including customer 630-A.

To further streamline the last-mile delivery of perishable goods, various embodiments described herein utilize additional aggregation depots corresponding to predetermined areas of customers or delivery destinations. As such, system 600 may further include one or more additional aggregation depots corresponding to a predetermined area that includes one or more customers or delivery destinations. Such aggregation depots corresponding to one or more customer locations in a predetermined area will be referred to as customer depots or customer hubs.

Such predetermined area of customers may have been identified as having high congestion due to limited parking and/or high vehicle or foot traffic. The predetermined area corresponding to the customers may be strategically defined based on one or more considerations such as accessibility to couriers and number of potential customers within a given radius. Various other factors, such as population density, order volume, traffic characteristics, and average courier travel times may also be used to determine appropriate locations for customer depots. In an example embodiment, customer depot 614 is located near an area with a high density of potential customers, such as a residential neighborhood, a college campus, or an area with a large number of apartment complexes.

As depicted in FIG. 6A, customer depot 614 corresponds to customers 630-A, 630-B, and 630-C. In some embodiments, the various customers may be located within a predetermined radius of the corresponding customer depot 614. For example, merchant depot 612-A may be within one (1) mile from customers 630-A, 630-B, and 630-C in the corresponding high traffic area.

In various embodiments, depot couriers transport order items between merchant depots and customer depots. Such orders or batches of orders may be assigned to depot couriers, such as depot couriers 622-A and 622-B, to transport the orders or batches of orders from merchant depots to customer depots. In some embodiments, depot couriers may travel along predetermined routes between merchant and customer depots. A depot courier may be assigned to a particular merchant depot or multiple merchant depots. A depot courier may be assigned to a single customer depot or multiple customer depots. For example, merchant courier 622-A may be assigned to transport orders from merchant depots 612-A and 612-B to one or more other customer depots (not shown), in addition to customer depot 614.

Once orders have arrived at the customer depot, a delivery courier may be assigned to pick up orders or batches of orders at the customer hub and complete delivery to customers. Orders arriving from different merchant depots may be further batched at a customer depot to further streamline delivery by delivery couriers. As shown, delivery courier 624-B picks up orders from customer hub 614 to deliver to customers 630-A and 630-B. However, in some embodiments, customers may directly retrieve orders from the customer depot. As shown, customer 630-C retrieves their order from customer hub 614 directly without involvement of any delivery courier or other personnel. For example, customer 630-C may receive a notification at a corresponding user device from the delivery routing system which includes information such as the storage location of the order in an automated locker system. The customer may also be provided an access code or other authenticating information to access the storage location.

Figure 6B:
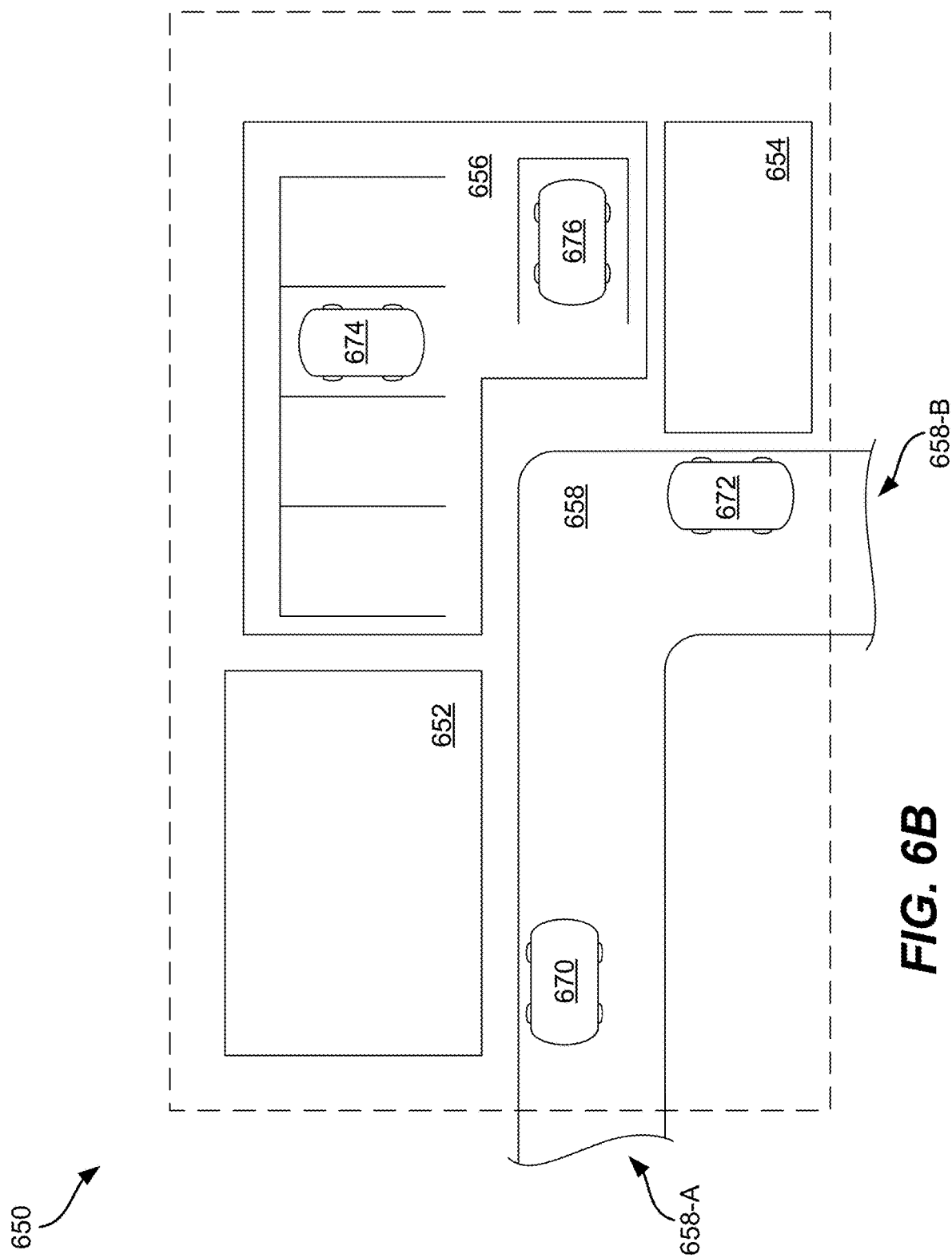
FIG. 6B illustrates another example of an aggregation depot, in accordance with one or more embodiments.

With reference to FIG. 6B, shown is an example of an aggregation depot 650, in accordance with one or more embodiments. In various embodiments, aggregation depot 650 may be a merchant depot or a customer depot. In various embodiments, aggregation depot 650 comprises operations area 652, loading zone 654, parking zone 656, driveway 658, and couriers 670, 672, 674, and 676. Couriers 670, 672, 674, and 676 may be any one of the merchant couriers, depot couriers, or delivery couriers described above.

In various embodiments, a dispatcher or other personnel are stationed at operations area 652 and loading zone 654 to oversee, organize, receive, and transfer orders. In some embodiments, operators of AV couriers are stationed at the operations area. In some embodiments, depot personnel may also include other human couriers or runners stationed at depot 650. In some embodiments, operations area 652 or loading zone 654 may also be configured with a loading area to store and receive orders. In some embodiments, such loading area may include lockers or other storage areas for receiving and storing the orders.

Having couriers stationed at depot locations allow for immediate assignments and transfer of orders. For example, a depot courier may be stationed at a merchant depot and receive orders directly from merchant couriers. As such, no additional travel time is required by the depot courier after being assigned the order. Furthermore, orders may be stored, aggregated, and batched directly at the depot courier stationed at the merchant depot without having to pass between other storage locations or personnel. For example, orders in a batch may be temporarily stored within the cargo module of a depot courier until all orders within the batch arrive. A similar delivery handoff arrangement may be implemented with delivery couriers at a customer depot to provide such "instant pickup" of orders from depot couriers themselves.

In various embodiments, driveway 658 is a road or other pathway that provides access to the aggregation depot for couriers. Driveway 658 may be accessed from a main road, sidewalk, or other pathway to enter the aggregation depot. In some embodiments, driveway 658 may be a one way path to allow an unrestricted flow of traffic through the depot. For example, couriers 670 and 672 are depicted in driveway 658. Couriers may enter aggregation depot 650 via driveway 658 at entrance 658-A and exit the aggregation depot at exit 658-B. In some embodiments, driveway 658 may be adjacent to and provide access to operations area 652 or loading zone 654, such as a drive thru.

Parking zone 656 may provide an area for AV couriers to temporarily park while orders are loaded or unloaded. Parking zone 656 may also provide an area for charging batteries of the parked AVs. For example, stationed couriers may park automobiles or store bicycles in between order assignments. In some embodiments, spare vehicles or spare parts may be stored in parking zone 656.

In various embodiments, a dispatcher or other personnel may organize the orders based on batching instructions received from the delivery routing system. In some embodiments, the batched orders may be organized into the same or adjacent locker locations. In other embodiments, couriers may be directed to deposit batched orders into the same or adjacent locker locations by the delivery routing system. In some embodiments, batched orders may be transferred to another loading area for pickup by subsequent couriers or customers. For example, operations area 652 may be designated for receiving orders from couriers, while loading zone 654 may be designated for transferring orders to couriers or customers.

The systems described herein may also utilize automation of one or more elements to further streamline the delivery process, reduce operational costs, and increase accuracy of generated event ETAs. In particular embodiments, an automated locker system may be implemented to store the orders which may be accessed using authenticating information, such as access codes or identification information. In various embodiments, orders may be dropped off at the depots by respective couriers or personnel into assigned lockers or other storage systems for the subsequent courier or customer to pick up without the need for additional personnel intervention.

The designated courier or customer may be authenticated using authenticating information. For example, an access code may be manually entered at the locker system or transmitted via wireless communication between client devices and the automated locker system. As another example, the access code may be entered at a corresponding client device and transmitted to the locker system. In some embodiments, the user may use a corresponding client device to scan a barcode, including Quick Release (QR) codes, at the locker to unlock the storage compartment. In some embodiments, the locker system may include a scanner to scan a barcode generated at the client device. This automated system of order retrieval would reduce or eliminate the need for personnel to oversee the depot and thereby reduce labor and improve efficiency.

For example, the delivery routing system may assign an order to a particular locker in loading zone 652. The delivery routing system may then transmit the locker location and an access code to a device corresponding to the courier assigned to deliver the order to the depot 650. Upon arrival at depot 650, the courier may then input the code to access the locker at operations area 652 or loading zone 654 to deposit the order. As another example, the courier may use the corresponding client device to transmit an access request with the access code to the delivery routing system or the locker system to open the designated locker. As yet another example, the courier may select an available locker location to deposit the order and transmit a notification of the locker location to the delivery routing system. A subsequent courier or customer may then be given the locker location by the delivery routing system. The subsequent courier or customer may similarly access the locker by inputting an access code or transmitting an access request. In some embodiments, each courier and customer may be assigned a personal access code and the lockers are configured to respond to the personal access code when assigned.

Additionally, one or more various pickup and drop off functions may be automated. In some embodiments, personnel at the depot may access the storage compartment of the AV to deposit or receive orders. In various embodiments, the personnel may access the storage compartment with an access code or access request via a corresponding client device. However, in particular embodiments, the AV may be configured to automatically access a storage location in an automated locker system for and load the order from the storage compartment into the locker. For example, the delivery routing system may transmit the location of an assigned locker to the AV, allowing the AV to locate and travel to the assigned locker. In some embodiments, the AV may transmit an access request for a particular locker to the delivery routing system or the automated locker system. In some embodiments, the locker may transmit an access request to unlock and open the storage compartment of the AV. In various embodiments, mechanisms may be installed in the locker or the AV to transport orders between the AV and the locker. Such mechanisms may include robotic arms, conveyer belts, lifts, ramps, etc.

Communications Between Autonomous Vehicles

AVs traveling between aggregation depots may communicate with other AVs traveling along the same predetermined route. For example, a first AV may transmit information gathered from its sensor module to a second AV at a different location along the route. This provides additional sensor input to the control module of the first AV to improve predictions and estimations by the spatial and speed planner. Thus, the control module of an AV will have more information and time to plan speed or positioning accordingly. A network of ten AVs implemented along a single route with the described systems may provide more comprehensive and detailed information than existing systems which implement many more AVs in a much larger area of operation.

For example, the sensor module of an AV may have a maximum range of 50 meters (m), and AVs may be able to communicate with another AV at a maximum range of 200 m. As such, an AV may be able to receive high fidelity sensor information relating to obstacles, traffic conditions, and road conditions, including emergency vehicles or high traffic or foot congestion, from up to 250 m away in the example.

Multiple AVs detecting the same object with respective sensor modules also provides redundancy in information which improves overall object detection, classification, and tracking. In an example, an AV which has been instructed to disregard a particular obstacle may transmit the obstacle disregard command to subsequent AVs traveling behind. This may allow the subsequent AVs to automatically disregard the previously unidentified object without transmitting additional alert notifications to the operator.

Communication between AVs may also be useful in cases where surrounding dynamic objects, like vehicles, are traveling at greater speeds relative to the AVs. For example, AVs may be traveling approximately 20 to 25 miles per hour (mph) in the bicycle lanes on roads with 45 mph speed limits. Vehicles traveling much faster than AVs may not be recorded in enough image frames for the control module to make a positive identification of the object or determine the estimated speed of the vehicle. As a faster vehicle passes subsequent AVs, the images of the vehicle that are captured may be aggregated to identify the vehicle. The relative speed of the vehicle may also be determined based on the distance between AVs detecting the vehicle, the number of image frames capturing the vehicle at each AV, and the location at which each of such image frames were obtained.

Operations Systems Network Architecture

Figure 7:
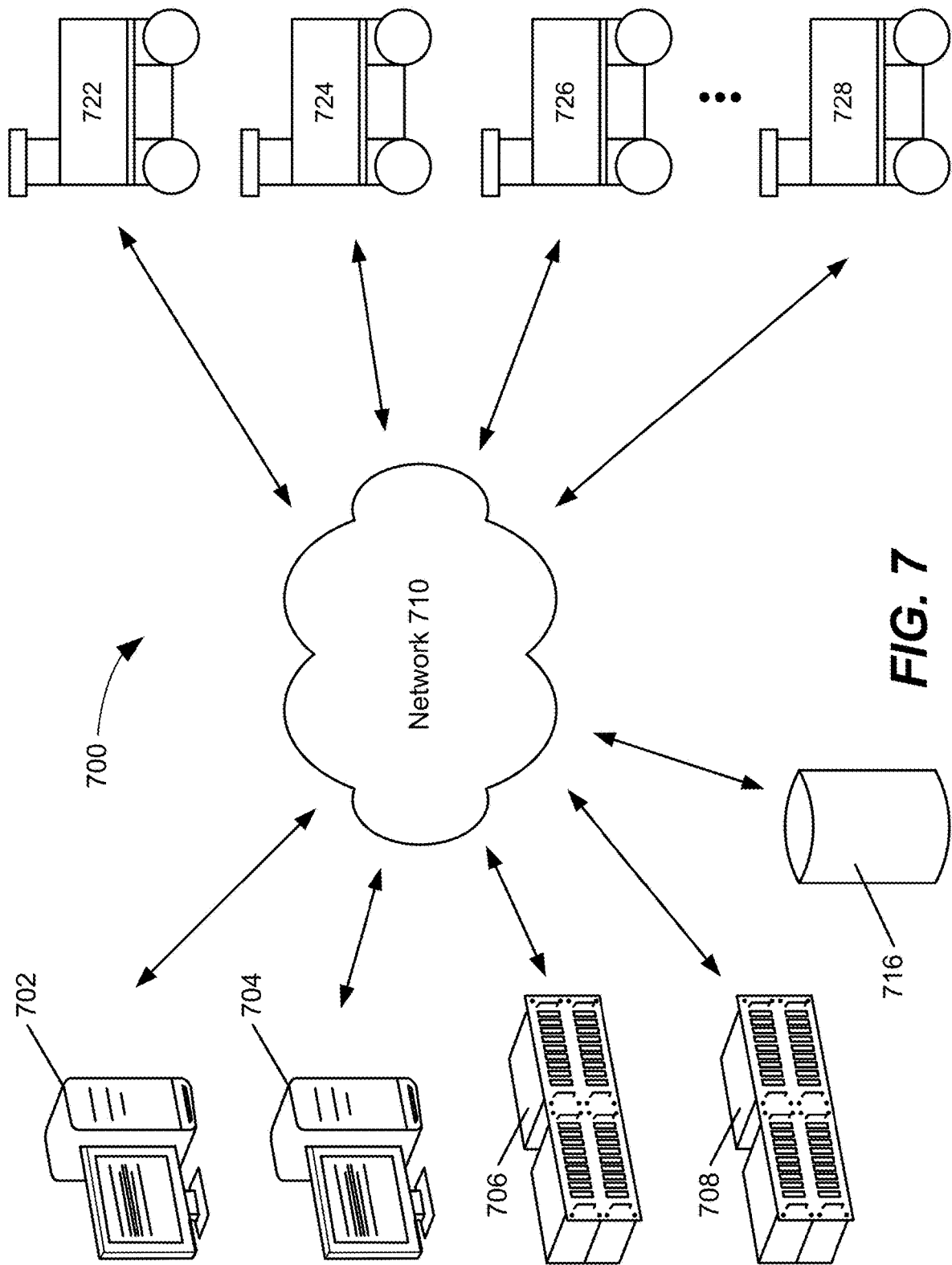
FIG. 7 illustrates a diagram of an example network architecture for implementing various systems and methods of the present disclosure, in accordance with one or more embodiments.

FIG. 7 illustrates a diagram of an example network architecture 700 for implementing various systems and methods of the present disclosure, in accordance with one or more embodiments. The network architecture 700 shows a AV fleet management system which includes a number of client devices 702 and 704 communicably connected to one or more AVs 722, 724, 726, and 728 by a network 710.

In various embodiments, each of client devices 702 and 704 is configured as an operator control unit, such as OCU 402. Each client device may be configured to operate or otherwise transmit control signals to one or more of AVs 722 to 728. In some implementations, the client devices 902-908 can be computing devices such as laptop or desktop computers, smartphones, personal digital assistants, portable media players, tablet computers, or other appropriate computing devices that can be used to communicate via network 710. In some implementations, each of server systems 706 and 708 can represent more than one computing device working together to perform the actions of a server computer (e.g., cloud computing). In some implementations, the network 710 can be a public communication network (e.g., the Internet, cellular data network, dial up modems over a telephone network) or a private communications network (e.g., private LAN, leased lines).

Network architecture 700 may further include server systems 706 and 708. In some embodiments, server systems 706 and 708 include one or more processors and memory. The processors of server systems 706 and 708 execute computer instructions (e.g., network computer program code) stored in the memory to perform functions of a network data exchange server. In some embodiments, servers 706 and 708 are configured as a single server system. In some embodiments, the functions of the network data exchange server may include monitoring and management of the status of networked AVs. In some embodiments, server system 706 may route status updates or notifications from an AV to an available client device to notify the operator or request operator input.

In some embodiments, the server systems may provide a web interface or dashboard for fleet monitoring of the networked AVs. Such server systems may subscribe to multiple networked AVs and monitor progress and feedback received from sensors. In some embodiments, the web interface or dashboard may be provided at a client device. Fleet monitoring may be performed by a shift manager to assign operating duties or detected issues or alerts to individual operators at corresponding OCU client devices. In other embodiments, one or more operating AVs may be assigned to a particular operator at an OCU and alerts are received directly at the assigned OCUs. In some embodiments, the fleet monitoring dashboard may receive higher latency feedback because no direct control functions are implemented at the dashboard and instantaneous transmission of data may not be necessary.

In some embodiments, the dashboard may monitor multiple alerts arising at a single OCU which may constrain operator attention. In such instances, one or more of those alerts may be transferred to available operators at other OCUs. Thus a single AV may receive control inputs by different operators from different OCUs throughout a single operating session. Once an issue that requires operator input is detected by an AV during hybrid autonomy mode, an alert notification may be transmitted to the corresponding OCU or dashboard.

Alerts may be triggered upon detection of various alert conditions. For example, unidentifiable objects within video data may trigger an alert notification for an operator to review the object and provide additional instructions. In another example, predetermined objects or locations, such as busy intersections or emergency vehicles and sirens, may be programmed to trigger an alert for the operator. In some instances, an alert may be triggered when the planner is unable to determine a safe motion plan based on the positioning or movement of recognized objects.

In various embodiments, the functions of the network data exchange server also includes routing real-time on-demand delivery of perishable goods, transmitting notifications or instructions to user devices, and/or predicting and dynamically updating estimated time of arrivals (ETAs) for such deliveries. Such information may be transmitted to the AVs to provide a designated route, such as between aggregation depots. As another example, order information, such as destination and order items, may be transmitted to OCUs to inform operators, as well as to AVs to assist sorting and batching of orders at aggregation depots. Although server systems 706 and 708 are depicted as separate components, in some embodiments, server systems 706 and 708 are configured as a single server system that is configured to perform the operations of both servers.

In some embodiments, the network architecture 700 may further include a database 716 communicably connected via network 710. Various programming instructions for servers and client devices may be stored in database 716. In some embodiments, network data, or other information such as user information, courier information, and merchant information, may be stored in and/or retrieved from database 716. In some embodiments, database 716 is a component of server systems 706 or 708.

Method for Hybrid Autonomy Operation

Figure 8A:
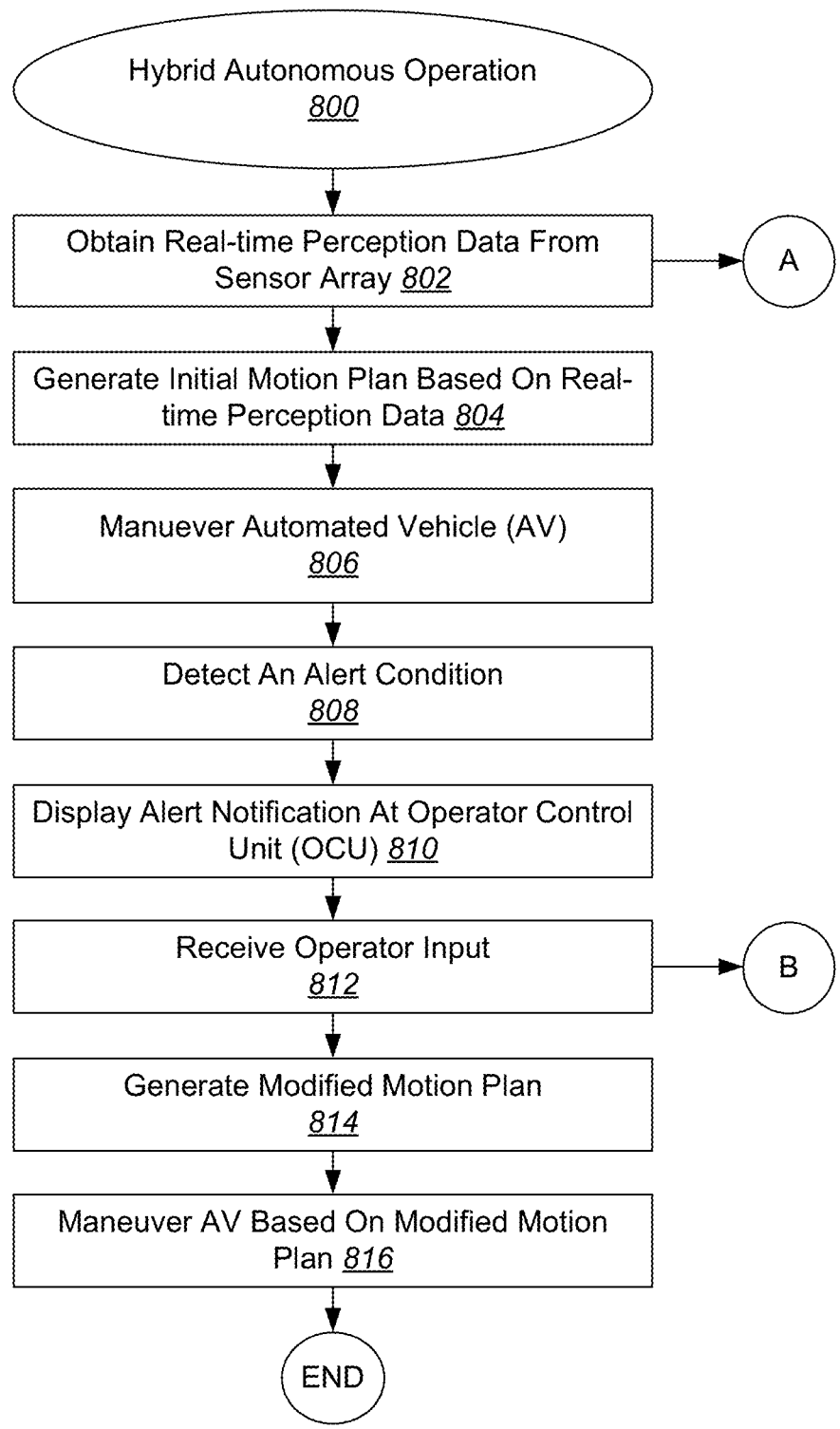
FIGS. 8A and 8B illustrate an example method for hybrid autonomous operation of an automated perishable goods delivery system, in accordance with one or more embodiments.
Figure 8B:
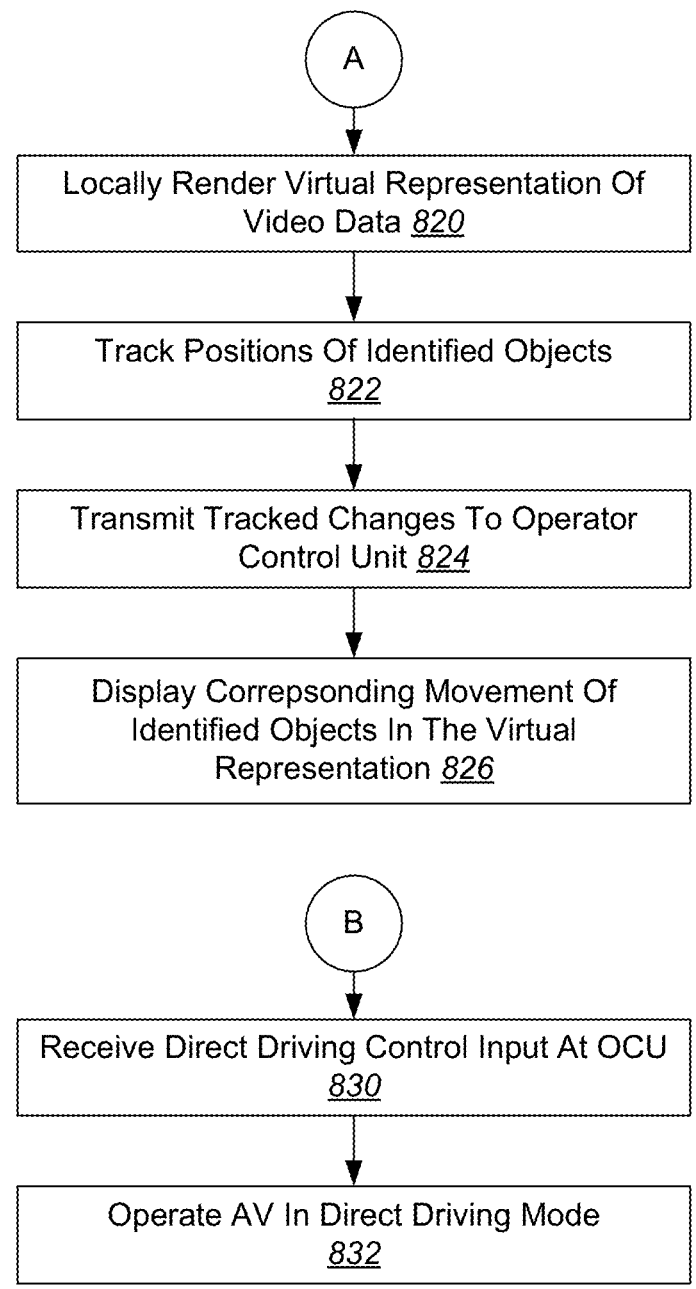

FIGS. 8A and 8B illustrate an example method 800 for hybrid autonomous operation of an automated perishable goods delivery system, in accordance with one or more embodiments. At operation 802, real-time perception data is obtained by a sensor array of the AV. The sensor array may be sensor module 114 including various sensors and measuring devices. Data gathered from the sensor array may be used to generate real-time perception data including obstacle tracks and signage, such as by software nodes 502. The real-time perception data may include identified or classified objects and signage, and tracking and velocity data of objects. As previously described each image frame captured by onboard cameras may be passed through various computational layers of a trained neural network for semantic segmentation to identify and label pixels according to a corresponding category or class of object.

The real-time perception data is then used by a planner module, such as planner 510-A, to generate an initial motion plan at operation 804. For example, the planner module may receive real-time perception data indicating a clear path in front of the AV. The planner module may also receive a reference trajectory for a predetermined path. The planner module may generate an initial motion plan to continue along the predetermined path at a determined velocity.

At operation 806, the AV is maneuvered based on the initial motion plan. As previously described, the motion plan may be transmitted to a controller, which publishes command references (CAN signal) to VCUs and other low-level controllers of various subsystems to generate power output or torque commands for the particular subsystem, such as steering and drive modules. In some embodiments, the AV may be maneuvered along a predetermined path, such as a constrained route between aggregation depots with limited path deviations.

As subsequent image data and other real-time perception data is obtained, motion plans may be adjusted and new motion plans may be generated for subsequent segments of the predetermined path. For example, the real-time perception data may indicate an obstacle, such as a pedestrian in front of the AV. The planner module may generate or modify the initial motion plan to reduce velocity or steer around the pedestrian or both.

However, the planner may encounter certain obstacles or conditions for which it cannot determine an appropriate motion plan. This may cause an alert condition to be detected at operation 808. The real-time perception data may indicate an unidentifiable object. For example, the image capture device may record a garbage bag with an amorphous or changing shape which the onboard computer cannot appropriately identify. In some embodiments, the planner may not be able to determine an appropriate motion plan based on movement and position of identifiable objects. As another example, the video data may show a highly variable situation, such as a bicycle accident. For instance, an identified object, such as a pedestrian or bicycle, may be detected as moving in an erratic pattern. In some embodiments, an alert condition may correspond to identifiable or predetermined events. For example, approaching a particular intersection may trigger an alert condition requiring operator input. If the onboard control system is not certain about an identified obstacle or determined course of action beyond a predetermined threshold probability, the alert condition may be transmitted to the fleet management system or OCU. As an example, an alert may be triggered if the probability of certainty of identification is below 60%.

At operation 810, the alert notification is displayed at an operator control unit (OCU). In some embodiments, the alert notification may be transmitted to an OCU assigned to the AV. In some embodiments, the alert notification may be transmitted to a fleet monitoring dashboard and routed to an available OCU. The alert notification may be displayed at the OCU with an image or video feed of the cause of the alert notification. The alert notification may further request user input.

An operator may provide user input at the OCU via various controls and interfaces at operation 812. The operator may view the provided information to determine whether to adjust the motion plan or to instruct the AV to disregard a particular obstacle. The user input may include one or more of the previously described operator controls such as longitudinal velocity, lateral offset, angular offset, and obstacle override. As used herein, user input provided by the operator at the OCU may be referred to as operator controls, operator commands, or operator input. The user input is then transmitted to the planner at the AV.

In an alert situation, an operator may control only a subset of control axes in the hybrid autonomy mode. In the instance of an unidentified object, the operator may be alerted to review the obstacle and determine whether the obstacle can be disregarded. This will allow the AV to continue on the motion plan determined by the planner.

In other instances, the operator may instruct the AV to disregard the obstacle, but adjust the longitudinal velocity, lateral offset, or both, to safely traverse the obstruction. For example, the AV may continue along the predetermined trajectory, but operator input may adjust the velocity to slow or speed up the AV in order to avoid the detected obstacle. As another example, the AV may continue with the same velocity, but operator input may adjust the lateral offset causing the AV to travel at a desired distance to the right or left of the predetermined trajectory to avoid the obstacle.

In yet another example, the AV may identify an intersection as a high variance situation with many traffic signals and potential pedestrians and other vehicles. Such situations may require intervention by a human operator to adjust the lateral offset or longitudinal velocity when crossing the intersection. In some embodiments, the AV may be changed to direct driving mode at intersections to allow the operator to directly transmit control signals to the vehicle control unit during these brief periods. Once past the intersection, hybrid autonomy mode may be reactivated to allow the AV to assume a majority or all of movement decisions. In some embodiments, operator input may be used to further train machine learning algorithms to improve perception, prediction, and tracking.

At operation 814, a modified motion plan is generated by the planner by adjusting the initial motion plan based on the user input. At operation 816, the AV is maneuvered based on the modified motion plan. As with the initial motion plan, the modified motion plan may be translated into command references (CAN signals) and translated into power output signals by corresponding low-level controllers. The user input adjusts the initial motion plan above the planner level, which allows the planner to continue to receive and consider additional object perception, prediction, and tracking data obtained from the sensor array during or after the operator provides user input. This provides an additional safety for additional obstacles or situations that may occur during or after user input is received. This also allows data, such as video data and user input, to be transmitted over high latency network connections since the planner can further modify or override the user input if needed.

In some embodiments, an operator may switch operation of the AV to direct driving mode to gain full operational control over the AV. This may require the operator to input a direct driving control input at operation 830, shown in FIG. 8B. A direct driving control input may be provided in response to an alert condition, such as after operation 812. For example, an operator may implement direct driving mode at predetermined intersections that are identified as particular busy or high variable. However, operator may implement direct driving mode at any time that is deemed necessary.

Once the direct driving control input is received at the AV, the low-level controllers (VCUs) may switch over to receive user input directly from the OCU to operate the AV in the direct driving mode at operation 832. During direct driving mode, a live video feed may be provided to the OCU and user input is transmitted to the AV over a high latency network connection.

In particular embodiments, operation of the obstacle override control or other operator commands, may be restricted or prohibited at high network latencies over a predetermined threshold. For example, the obstacle override control may be deactivated when detected network latency is above 30 to 40 milliseconds (ms). This will prevent delayed commands to disregard obstacles which may not reach the planner or controller in time, and serve as an additional safety over existing systems. Similarly, switching to direct driving mode may be prevented at high network latencies over a predetermined threshold, to prohibit direct operator controls under slow network connectivity. In some embodiments, the need for increased data transfer during direct driving may set the threshold for network latency even lower, such as 20 ms for example.

In some embodiments, a threshold lag time for command signals may be set in hybrid autonomy mode, direct driving mode, or both. For example, command signals from the OCU may be viable for 5 seconds. The command signals may be transmitted with a time stamp in metadata. The operator command signals will be implemented by the planner if received within 5 seconds of the timestamp, or disregarded if received after 5 seconds of the timestamp. A notification may be provided to the OCU to indicate that a command signal was disregarded in the way. Where the AV requires operator input, but receives a command signal after the viable time threshold, the AV may slow down or stop to allow additional operator inputs to be transmitted.

The hybrid autonomy system architecture allows for an operator to fill in for current deficiencies of autonomous driving, such as object recognition and decision making. By operating in hybrid autonomy mode, an operator is not responsible for all control functions of an AV at all time. This provides the advantage for more well-defined modes of interaction for the operator and reduces off-plan motions and variations in decision caused by human error. As such, training time and effort is greatly reduced with the simplification of control functions.

Since the AV performs a majority of the trajectory planning and object tracking via the planner, it reduces operator stress and creates more operating capacity for an operator to supervise multiple AVs because each AV will only require immediate attention during certain alert situations. This translates to more AVs being managed by a given number of operators allowing for a consistent supply of operators for all deliveries. Along with the ability for AV couriers to transport aggregated batches of orders, a single operator could manage the transport of a number of deliveries that would require many times more human couriers. This results in cost savings and less wait time for deliveries.

Furthermore, hybrid autonomy driving only requires limited operator feedback during certain circumstances. This greatly reduces the latency and network requirements because operator controls and video feeds do not need to be transmitted instantaneously. For example, an operator may be alerted to an unidentifiable object at about 50 m away, providing adequate time for the alert with an image of the object to be transmitted to the OCU before an action or decision is required. Thus, video feeds transmitted with a delay over low latency connection or videos feeds with frame rates slower than 1 FPS may be adequate. Furthermore, sensor data shared between AVs along a predetermined route will provide information to operators even earlier if needed. Additionally, if the AV does not receive instructions based on an alert situation in time, the AV may stop travel to safely receive instructions after operator review.

Local Renderings at Operator Display

In some embodiments, a live video feed over high latency connection may be provided when direct driving mode is activated. However, in some embodiments, during the hybrid autonomy mode, local renderings at the OCU of video data obtained from one or more AVs may further reduce network and latency requirements. This prevents the need for a constant live video feed captured by the AV to be transmitted to the operator. Instead, a local virtual rendering of the video feed may be displayed at the OCU. For example the local rendering may include virtual representations of various objects classified by the AV.

In some embodiments, objects such as buildings, people, cars, bicycles, trees, and other identified objects may be locally rendered as digital representations or avatars. These virtual representations may be rendered in their respective positions corresponding to the image data in the video feed. As identified objects move relative to the AV during operation, only deltas or changes in position of a subset of pixels are transmitted back to indicate movement or current positions of the identified objects in the virtual rendering. This greatly reduces the amount of data needed to be transmitted between the AV and the OCU or dashboard. In certain embodiments, pixels near the edges of the object may be tracked in order to provide the boundary of the object, which can be used to extrapolate changes in the size of the object and relative distance from the AV.

Referring to FIG. 8B, operations 820-826 describe transmission and display of real-time perception data to an OCU. Although operations 820-826 may be described with reference to displaying data at an OCU, it should be recognized that such operations are operable at other devices, such as a fleet management dashboard or other server system. In order to reduce data transmission and improve operational reliability over low latency network connections, the system may provide a local rendering of the AV's surroundings at operation 820 based on captured video and other real-time perception data. This prevents the need for a constant live video feed captured by the AV to be transmitted to the operator and greatly reduces the data transmission and processing required by existing systems.

Instead, real-time perception data, including object recognition data, are transmitted to the OCU, fleet management dashboard, or other server system. The OCU may create and display a local virtual rendering of the video feed based on the detected or identified objects in the real-time perception data. For example the local rendering may include virtual representations of various objects identified by the onboard computer system of the AV. Objects such as buildings, people, cars, bicycles, trees, and other identified objects may be locally rendered as digital representations or avatars. These virtual representations may be rendered in their respective positions corresponding to the image data in the video feed and real-time perception data.

Figure 9:
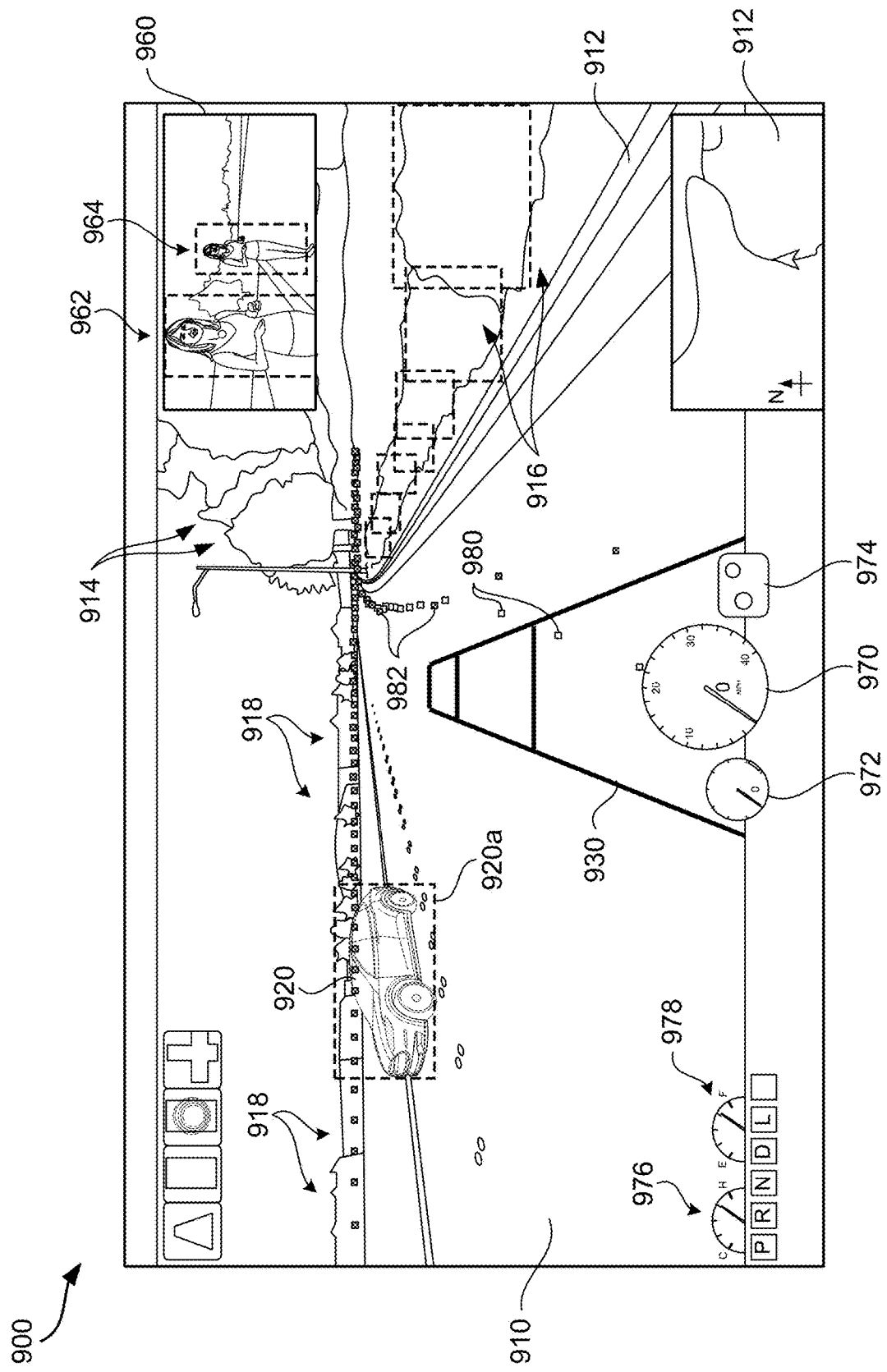
FIG. 9 illustrates an example operator display interface for an automated perishable goods delivery system, in accordance with one or more embodiments.

With reference to FIG. 9, shown is an example operator display interface 900 for an automated perishable goods delivery system, in accordance with one or more embodiments. Interface 900 may be presented through a display of an OCU device. However, in some embodiments, interface 900 may be presented through other components, such as wearable virtual reality or augmented reality goggles. Interface 900 is depicted as displaying images of objects other sensor data obtained at the AV. The interface shows the surroundings of the AV, including road 910, curb 912, and surrounding trees 914, bushes, 916 and other foliage. Various buildings 918 and trees can also be viewed in the distance. Vehicle 920 is an oncoming automobile traveling in the opposite lane. The interface may also display a rear view 960 of the surroundings which may be captured by a rear camera on the AV or sensor array. Rear view 960 may show pedestrians 962 and 964.

In some embodiments, the displayed images may be a local rendering of objects detected and classified by the AV onboard computer system. In some embodiments, renderings for common classes of objects may be standardized, which further reduces processing requirements at the OCU. For example, objects identified as pedestrians, such as pedestrians 962 and 964, may all be represented in the virtual rendering with the same avatar. In some embodiments, a subset of pixels corresponding to the identified objects may be transmitted to be incorporated into the digital representation. For example, a portion of the pixels corresponding to a pedestrian in the image data, or data indicating thereof, may be transmitted to apply details, such as color of clothing, skin, and hair, in the corresponding avatar. As another example, information corresponding to the color of the oncoming vehicle may be transmitted to be incorporated into the virtual avatar of the vehicle 920. This may provide some real-time detail of the identified objects without requiring all pixels to be transmitted to the OCU or other server system from the AV.

In some embodiments, constant static objects such as road 910, curb 912, buildings 918, signs, and trees 914, which remain substantially constant through each leg of a predetermined route may be virtually rendered as avatars. Because they are mostly constant during each trip, static objects may be more easily virtually rendered with less object recognition needed, and less data transmitted from the AV. The static objects, such as buildings, may also be locally rendered at the OCU based at least in part on the AV's location or map information.

Dynamic objects, such as vehicle 920 and pedestrians 962 and 964 may be different during each travel along the predetermined route. Such dynamic object may also be locally rendered as virtual avatars. However, dynamic objects, or unclassified objects may be displayed as captured. For example, images of dynamic objects such as bicycles, pedestrians, animals, and vehicles, which are moving and not constant throughout the route, are detected or identified, and displayed as captured on top of virtual renderings of static objects. In some embodiments, the image within a bounding box around the dynamic or changing object may be transmitted to the OCU. For example, actual footage of vehicle 920 may be shown through bounding box 920a tracked by the onboard computer. While transmitting actual footage may increase the amount of data transmitted from the AV, it would reduce the data processing required at the AV to classify objects. Instead, the AV would only need to detect and track a dynamic object and transmit the portion of image data containing the dynamic object.

Referring back to FIG. 8B, positions of the detected objects are tracked by the onboard computer of the AV at operation 822. As detected objects move relative to the AV during operation, only deltas or changes in the positions of the detected objects are transmitted back to indicate movement or current positions of the detected objects in the virtual rendering. As such, the entire point cloud for a detected object does not need to be transmitted over the network to the OCU or fleet management dashboard.

In some embodiments, the changes in position of a detected object may be determined at the AV by generating a bounding box around the object. The bounding box may be a box with minimum length and minimum height to fully surround the pixels corresponding to the detected object. Such bounding box may provide the size (height and width) of the object. The relative position of the bounding box in the image frame may also determine the relative position of the virtually representation in the local rendering. The bounding box data for an object may be transmitted to the OCU.

In some embodiments, the changes in positions may be determined by tracking the pixels associated with a detected object in the video data. In some embodiments, only a subset of pixels for each detected object are tagged and tracked. This may reduce processing requirements of the AV's onboard computer. In certain embodiments, pixels near the edges of the object may be tracked in order to provide the boundary of the object, which can be used to extrapolate changes in the size of the object and, accordingly, the relative distance from the AV. In some embodiments, one or more pixels at the center of an object may also be identified and tracked in relation to the boundary pixels.

In some embodiments, pixels at designated keypoints of an object may be tagged for tracking. In various embodiments, keypoints may be identified using a Harris-style corner detector algorithm or other keypoint detection method. In other embodiments, various other corner detection algorithms may be implemented, such as a Moravec corner detection algorithm, a Forstner corner detector, etc. Such corner detector algorithm may be implemented to detect salient features to designate as keypoints in each frame, such as areas of large contrast, areas with minimum ambiguity in different dimensions, and/or areas with high cornerness. A predetermined number keypoints with the highest Harris score may then be selected. Deltas or changes in the positions of the tracked pixels may then be transmitted to the OCU.

At operation 826, the OCU may display updated positions of the detected objects in the virtual representation based on the changes indicated by the data received from the AV. For example, the position of vehicle 920 in the display may be updated based on changes in tracked pixels calculated at the AV. This greatly reduces the amount of data needed to be transmitted between the AV and the OCU. The local virtual rendering may allow an operator to or shift manager to continually monitor the progress of a given AV with reduced data transfer and network usage. In certain examples, a complete video feed may be transmitted to the OCU or dashboard with an alert notification. In some embodiments, the operator may access the video feed when responding to the alert notification. This video feed may be transmitted over high or low latency connection. A high latency connection may provide a live real-time video feed showing the issue causing the alert condition. However, some delay in the video feed (i.e., over low latency connection) may be acceptable as the AV is still assumes a majority of control and maneuvering during an alert condition.

In some embodiments, local renderings from multiple AVs along a predetermined route may be generated at the fleet management dashboard. This would provide a virtual three-dimensional rendering of the predetermined route which would allow improved fleet monitoring and coordination by a shift manager.

Referring back to FIG. 9, guidelines 930 may be overlaid to project a grid showing the width of the vehicle and a projected forward distance of three lengths of the AV. In some embodiments, guidelines 930 may be dynamic and may display the angular trajectory of the AV. As previously explained, bounding boxes may be provided around objects detected by LiDAR or object classification algorithms. For example, bounding box 920a highlights vehicle 920, while bushes 916 are surrounded by bounding boxes. In various embodiments, bounding boxes may be provided around objects in the foreground. However, background objects like trees and buildings may also be presented within bounding boxes.

An operator may also view various operational statuses of the AV via the interface. As depicted, interface 900 displays speedometer 970 and tachometer 972. Brake gauge 974 may also be displayed. In some embodiments, vehicle temperature is shown at gauge 976 and battery or fuel level is shown at gauge 978. A map overlay 912 may also be presented to show the location of the AV with respect to roads and motorways based on GPS or other sensor data. The operator may also access different viewpoints and additional sensor information via interface 900.

The reference trajectory and motion plan may also be viewed in interface 900. A reference trajectory determined by trajectory generator is depicted by shaded square points, such as trajectory point 982. As shown in FIG. 9, the reference trajectory points follow the road and curve rightward, and further show a left turn in the distance from where the reference trajectory continues to the left. In some embodiments, the reference trajectory may only be shown up to a predetermined distance of travel in front of the AV. However, in some embodiments, the entire reference trajectory may be displayed via the reference trajectory points.

The motion plan determined by the planner may be displayed via the blank square points, such as motion plan point 980. These points indicate where the intended positioning of the AV as determined by the planner or operator. In general, the motion plan points should coincide or align with the reference trajectory points. However, where the planner or operator has determined a deviation (due to an obstacle for example), the motion plan points and reference trajectory points may diverge. In FIG. 9, the shaded reference trajectory points (982) show a predetermined path that is closer to curb 912 toward the right side of road 910. For example, the AV may have adjusted the lateral offset of the motion plan toward the center of the road to avoid pedestrians 962 and 964 (shown in the rear view). Since AV has passed the pedestrians, the blank motion plan points show a gradual return toward the right where the motion plan points align with the reference trajectory points.

Figure 10:
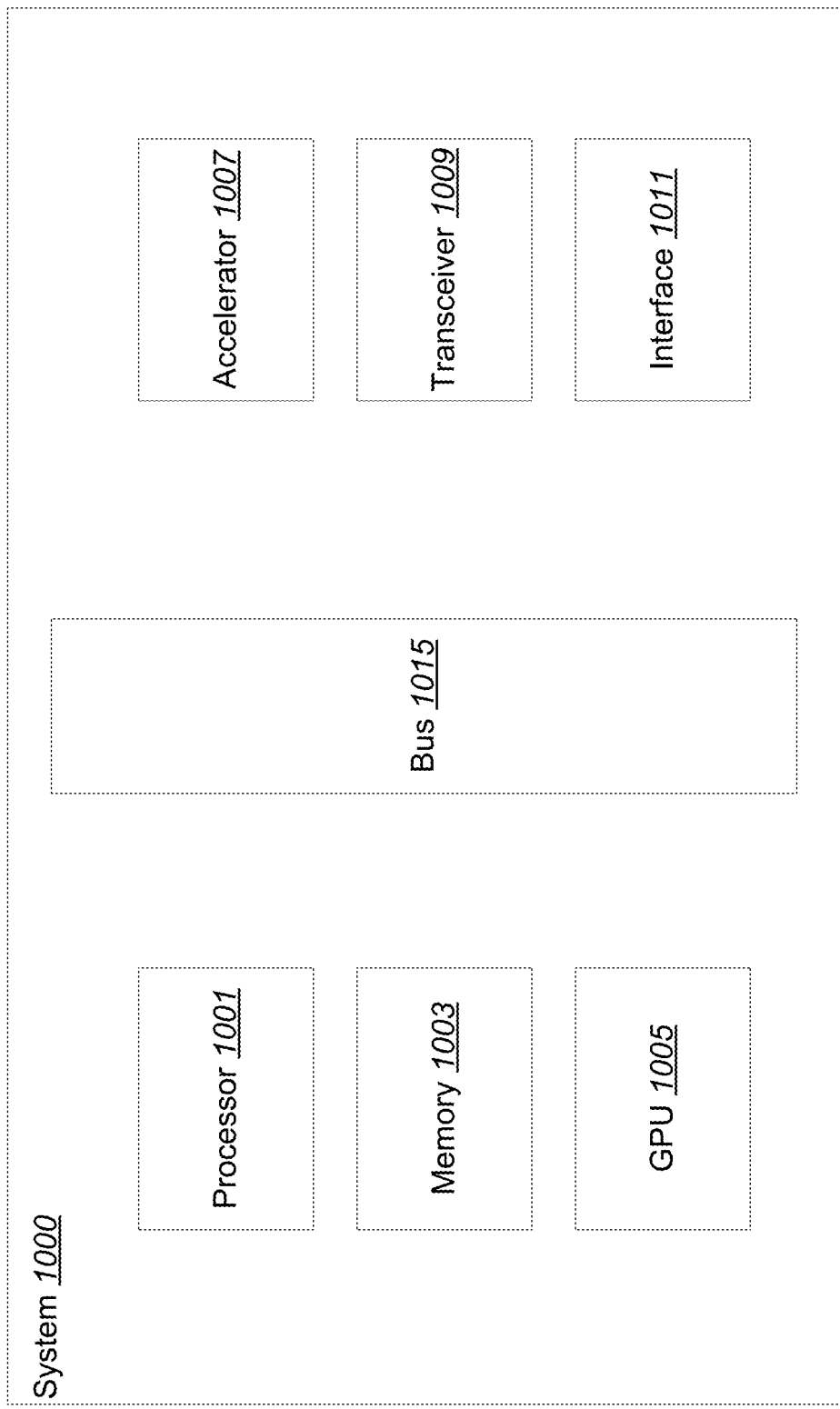
FIG. 10 illustrates a particular example of a computer system that can be used with various embodiments of the present disclosure.

Various computing devices, such as a mobile device or computer system, can implement the systems and methods described herein. With reference to FIG. 10, shown is a particular example of a computer system 1000 that can be used to implement particular examples of the present disclosure. Computer system 1000 may depict any one of the described AV control modules, VCUs, ECUs, various software modules or nodes, a client device such as an OCU, or a server system, or fleet management dashboard. According to particular example embodiments, a system 1000 suitable for implementing particular embodiments of the present disclosure includes processor 1001, memory 1003, graphics processing unit 1005, accelerator 1007, transceiver 1009, interface 1011, and bus 1015 (e.g., a PCI bus).

When acting under the control of appropriate software or firmware, the processor 1001 may be responsible for processing inputs through various computational layers and algorithms in a neural network. In some embodiments, the processor is responsible for updating the parameters of each computational layer using algorithms, including but not limited to, a stochastic gradient descent algorithm and a back propagation algorithm. In some embodiments, the processor is configured to process and render image data. In some embodiments, the processor is configured to transmit and receive control signals and other information, such as vehicle control signals, vehicle status, video data, and location information. In some embodiments, the processor is configured to perform pairing and routing tasks of a logistics platform for real-time on-demand delivery of perishable goods. Various specially configured devices can also be used in place of a processor 1001 or in addition to processor 1001. The complete implementation can also be done in custom hardware.

The interface 1011 is typically configured to send and receive data packets or data segments over a network. Particular examples of interfaces the device supports include Ethernet interfaces, frame relay interfaces, cable interfaces, DSL interfaces, token ring interfaces, and the like. The interface 1011 may include separate input and output interfaces, or may be a unified interface supporting both operations. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

Transceiver 1009 is typically a combination transmitter/receiver device. However system 1000 may include a transmitter and a receiver as separate components in some embodiments. Transceiver 1009 may be configured to transmit and/or receive various wireless signals, including Wi-Fi, Bluetooth, etc. In some embodiments, system 1000 may function as a client device or location sensor or beacon to track location of an individual via wireless signals. The connection or communication between a client device and a beacon may indicate the presence of the corresponding individual in a particular location. In various embodiments, transceiver 1009 may operate in a half duplex or full duplex mode. Various protocols could be used including various flavors of Bluetooth, Wi-Fi, light of sight transmission mechanisms, passive and active RFID signals, cellular data, mobile-satellite communications, as well as LPWAN, GPS, and other networking protocols. According to various embodiments, the transceiver may operate as a Bluetooth or Wi-Fi booster or repeater.

According to particular example embodiments, the system 1000 uses memory 1003 to store data and program instructions for operations including training a neural network to identify objects in image data, generate virtual renderings of the image data, and generating motion plans based on operator input, sensor data, and location data. For example, the memory may store program instructions for implementing any one or more of the operations of method 800. The program instructions may control the operation of an operating system and/or one or more applications, for example. The memory or memories may also be configured to store received metadata and batch requested metadata. The memory or memories may also be configured to store data corresponding to parameters and weighted factors.

In some embodiments, system 1000 further comprises a graphics processing unit (GPU) 1005. As described above, the GPU 1005 may be implemented to process each pixel on a separate thread to compute and determine transformations or position changes. In some embodiments, system 1000 further comprises an accelerator 1007. In various embodiments, accelerator 1007 is a rendering accelerator chip, which may be separate from the graphics processing unit. Accelerator 1007 may be configured to speed up the processing for the overall system 1000 by processing pixels in parallel to prevent overloading of the system 1000. For example, in certain instances, ultra-high-definition images may be processed, which include many pixels, such as DCI 4K or UHD-1 resolution. In such instances, excess pixels may be more than can be processed on a standard GPU processor, such as GPU 1005. In some embodiments, accelerator 1007 may only be utilized when high system loads are anticipated or detected.

In some embodiments, accelerator 1007 may be a hardware accelerator in a separate unit from the CPU, such as processor 1001. Accelerator 1007 may enable automatic parallelization capabilities in order to utilize multiple processors simultaneously in a shared memory multiprocessor machine. The core of accelerator 1007 architecture may be a hybrid design employing fixed-function units where the operations are very well defined and programmable units where flexibility is needed. In various embodiments, accelerator 1007 may be configured to accommodate higher performance and extensions in APIs, particularly OpenGL 2 and DX9.

Because such information and program instructions may be employed to implement the systems/methods described herein, the present disclosure relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the disclosure. It is therefore intended that the disclosure be interpreted to include all variations and equivalents that fall within the true spirit and scope of the present disclosure.

What is claimed is:

1. A method, comprising:
generating, at an autonomous vehicle operating in a hybrid autonomy mode, real-time perception data using a machine learning model, the real-time perception data indicating objects that have been detected in a vicinity of the autonomous vehicle;
generating, at the autonomous vehicle operating in the hybrid autonomy mode, an initial motion plan based, at least in part, on the real-time perception data;
maneuvering the autonomous vehicle operating in the hybrid autonomy mode along a constrained route based on the initial motion plan without user input;
receiving, at the autonomous vehicle operating in the hybrid autonomy mode, input including a lateral offset and an angular offset;
responsive to the input, modifying a route via which the autonomous vehicle is traveling;
detecting, at the autonomous vehicle operating in the hybrid autonomy mode, an alert condition from the real-time perception data, the alert condition indicating that a classification of one of the objects is not possible or probability of certainty of identification of the one of the objects is below a threshold percentage;
transmitting, by the autonomous vehicle operating in the hybrid autonomy mode to a client device, an image of the one of the objects, wherein during an alert condition, an operator can control only a subset of control axes;
transmitting, by the autonomous vehicle operating in the hybrid autonomy mode to a client device, a notification corresponding to the alert condition, wherein the notification indicates a request for user input to adjust the initial motion plan;
receiving the user input at the autonomous vehicle operating in the hybrid autonomy mode;
generating, by the autonomous vehicle operating in the hybrid autonomy mode, a modified motion plan by adjusting the initial motion plan based on the user input;
updating the machine learning model based, at least in part, on the user input;
responsive to determining that a detected network latency is greater than a predefined threshold, prohibiting, by the autonomous vehicle operating in the hybrid autonomy mode, activation of a direct driving mode and continuing-arbitrating between autonomous control of the autonomous vehicle and additional user input;
responsive to a disruption in network connectivity, reducing a frame rate at which video data is transmitted to the client device.

2. The method of claim 1, further comprising:
converting the modified motion plan into power output signals for a steering mechanism and a motor of the autonomous vehicle;
moving the steering mechanism based on the power output signals; and
generating wheel motion by the motor based on the power output signals.

3. The method of claim 1, wherein the user input includes one or more of the following:
longitudinal velocity adjustments, lateral offset adjustments, or an obstacle disregard selection.

4. The method of claim 1, wherein the real-time perception data is obtained from a sensor array of the autonomous vehicle.

5. The method of claim 1, wherein the notification corresponding to the alert condition includes a notification of an unidentified obstacle.

6. The method of claim 1, wherein the real-time perception data includes:
video data captured by an image capture device located on the autonomous vehicle.

7. The method of claim 6, wherein the real-time perception data further includes one or more of:
geolocation data, object recognition data, object proximity data, or audio data.

8. The method of claim 6, further comprising:
transmitting object recognition data to the client device, the object recognition data corresponding to identified objects in the video data;
locally rendering a virtual representation of the identified objects for display at the client device;
tracking positions of a subset of pixels corresponding to the identified objects;
transmitting changes in the positions of the subset of pixels to the client device; and
displaying, at the client device, movement of the identified objects in the virtual representation based on the changes in the positions of the subset of pixels.

9. The method of claim 8, further comprising alternating from the hybrid autonomy mode to a direct driving mode,
wherein the autonomous vehicle is fully controlled by user input in the direct driving mode,
wherein alternating from the hybrid autonomy mode to the direct driving mode is initiated responsive to override input at the device.

10. The method of claim 9, wherein alternating from the hybrid autonomy mode to the direct driving mode is prohibited if the detected network latency is greater than the predefined threshold.

11. The method of claim 1, wherein the constrained route leads from a first aggregation depot to a second aggregation depot.

12. A system comprising:
an autonomous vehicle including one or more processors configurable to cause:
generating, at the autonomous vehicle while operating in a hybrid autonomy mode, real-time perception data using a machine learning model, the real-time perception data indicating objects that have been detected in a vicinity of the autonomous vehicle;
generating, at the autonomous vehicle operating in the hybrid autonomy mode, an initial motion plan based, at least in part, on the real-time perception data;
maneuvering the autonomous vehicle operating in the hybrid autonomy mode along a constrained route based on the initial motion plan without user input;
receiving, at the autonomous vehicle operating in the hybrid autonomy mode, input including a lateral offset and an angular offset;
responsive to the input, modifying a route via which the autonomous vehicle is traveling;
detecting, at the autonomous vehicle operating in the hybrid autonomy mode, an alert condition from the real-time perception data, the alert condition indicating that a classification of one of the objects is not possible or probability of certainty of identification of the one of the objects is below a threshold percentage;

transmitting, by the autonomous vehicle operating in the hybrid autonomy mode to a client device, an image of the one of the objects, wherein during an alert condition, an operator can control only a subset of control axes;

transmitting, by the autonomous vehicle operating in the hybrid autonomy mode to a client device, a notification corresponding to the alert condition, wherein the notification indicates a request for user input to adjust the initial motion plan;

receiving the user input at the autonomous vehicle operating in the hybrid autonomy mode;

generating, by the autonomous vehicle operating in the hybrid autonomy mode, a modified motion plan by adjusting the initial motion plan based on the user input;

updating the machine learning model based, at least in part, on the user input;

responsive to determining that a detected network latency is greater than a predefined threshold, prohibiting, by the autonomous vehicle operating in the hybrid autonomy mode, activation of a direct driving mode and continuing-arbitrating between autonomous control of the autonomous vehicle and additional user input; and responsive to a disruption in network connectivity, reducing a frame rate at which video data is transmitted to the client device.

13. The system of claim 12, the processors further configurable to cause:
converting the modified motion plan into power output signals for a steering mechanism and a motor of the autonomous vehicle.

14. The system of claim 12, wherein the user input includes one or more of the following:
longitudinal velocity adjustments, lateral offset adjustments, or an obstacle disregard selection.

15. The system of claim 12, wherein the notification corresponding to the alert condition includes a notification of an unidentified obstacle.

16. The system of claim 12, wherein the real-time perception data includes one or more of the following: video data captured by an image capture device of the sensory array, geolocation data, object recognition data, object proximity data, or audio data.

17. The system of claim 16, the processors further configurable to cause:
identifying objects in the video data, tracking pixel changes to determine movement of objects in the video data, and transmitting the pixel changes to the operator device.

18. The system of claim 17, the processors further configurable to cause:
activating a direct driving mode responsive to override input received from the client device, wherein the autonomous vehicle is fully controlled by user input in the direct driving mode.

19. The system of claim 18, wherein activating the direct driving mode is prohibited if the detected network latency is greater than the predefined threshold.

20. One or more non-transitory computer readable media storing instructions that, when executed, cause an autonomous vehicle to execute a method, comprising:

generating, at the autonomous vehicle while operating in a hybrid autonomy mode, real-time perception data using a machine learning model, the real-time perception data indicating objects that have been detected in a vicinity of the autonomous vehicle;

generating, at the autonomous vehicle operating in the hybrid autonomy mode, an initial motion plan based, at least in part, on the real-time perception data;

maneuvering the autonomous vehicle operating in the hybrid autonomy mode along a constrained route based on the initial motion plan without user input;

receiving, at the autonomous vehicle operating in the hybrid autonomy mode, input including a lateral offset and an angular offset;

responsive to the input, modifying a route via which the autonomous vehicle is traveling;

detecting, at the autonomous vehicle operating in the hybrid autonomy mode, an alert condition from the real-time perception data, the alert condition indicating that a classification of one of the objects is not possible or probability of certainty of identification of the one of the objects is below a threshold percentage;

transmitting, by the autonomous vehicle operating in the hybrid autonomy mode to a client device, an image of the one of the objects, wherein during an alert condition, an operator can control only a subset of control axes;

transmitting, by the autonomous vehicle operating in the hybrid autonomy mode to a client device, a notification corresponding to the alert condition, wherein the notification indicates a request for user input to adjust the initial motion plan;

receiving the user input at the autonomous vehicle operating in the hybrid autonomy mode;

generating, by the autonomous vehicle operating in the hybrid autonomy mode, a modified motion plan by adjusting the initial motion plan based on the user input;

updating the machine learning model based, at least in part, on the user input;

responsive to determining that a detected network latency is greater than a predefined threshold, prohibiting, by the autonomous vehicle operating in the hybrid autonomy mode, activation of a direct driving mode and continuing-arbitrating between autonomous control of the autonomous vehicle and additional user input; and responsive to a disruption in network connectivity, reducing a frame rate at which video data is transmitted to the client device.

* * * * *